Oct. 4, 1960 — R. C. LAWLOR — 2,954,608
DRIFT AND GROUND SPEED INDICATOR
Filed Oct. 30, 1956 — 6 Sheets-Sheet 1
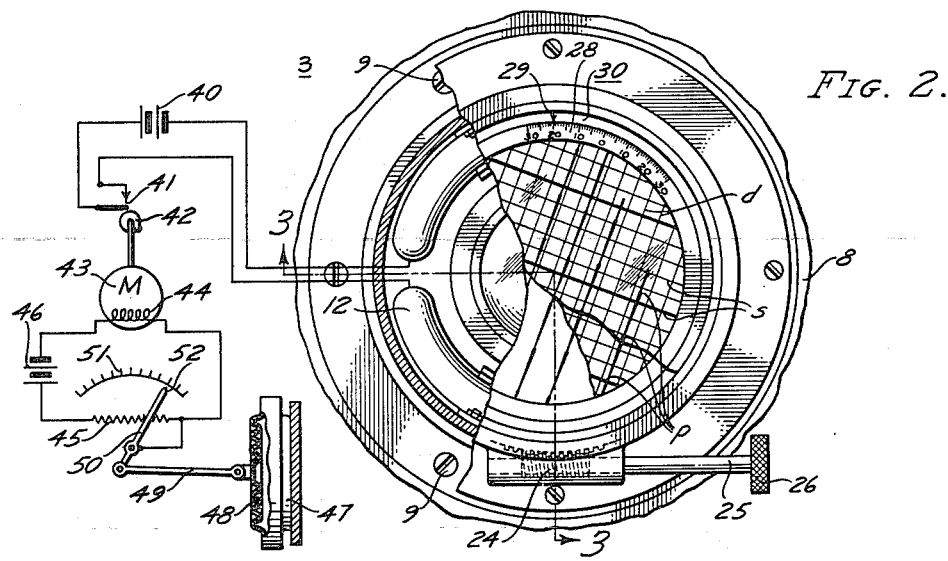
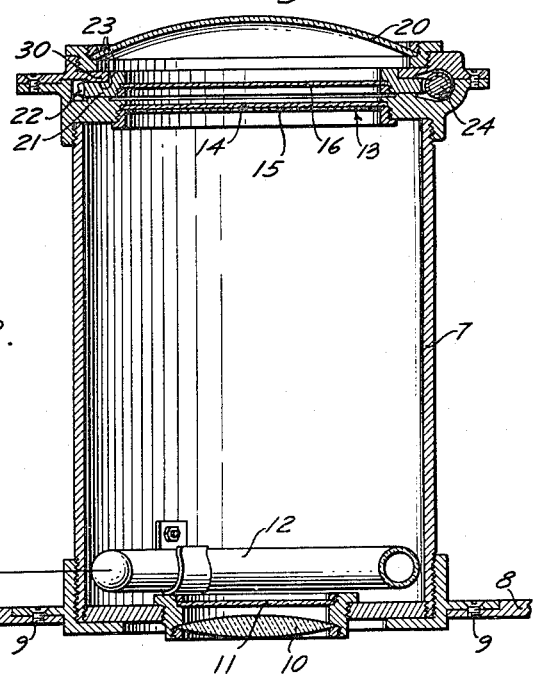
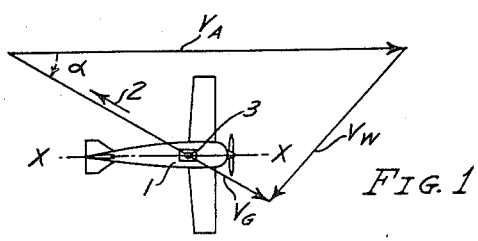
INVENTOR
Reed C. Lawlor

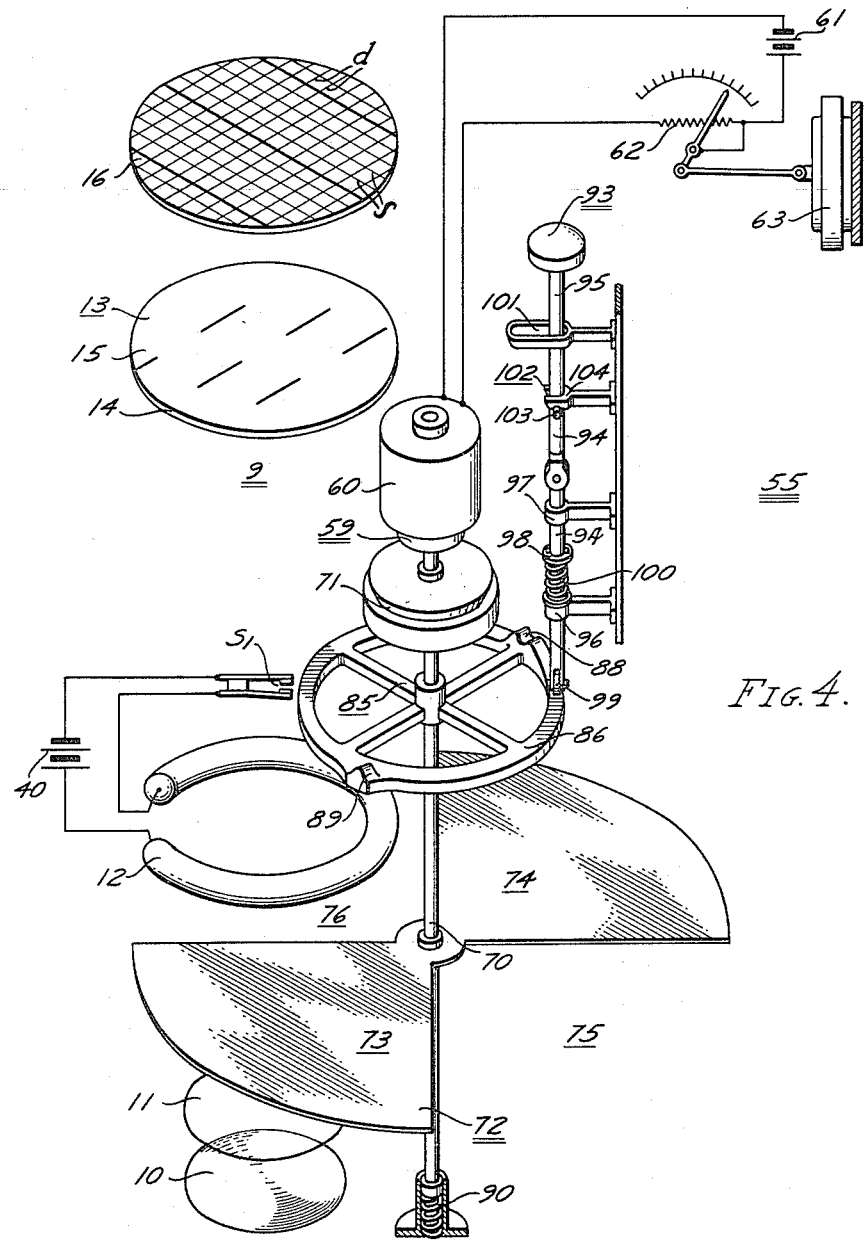

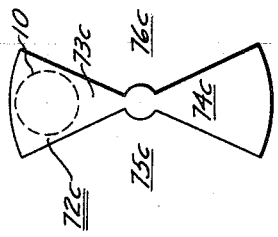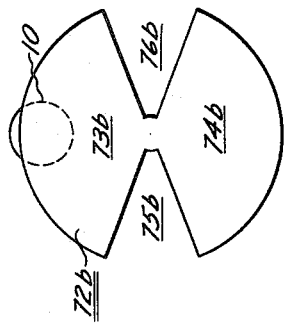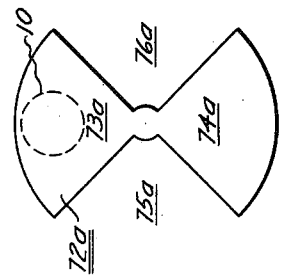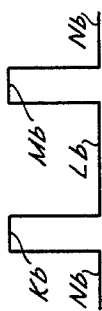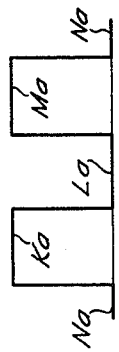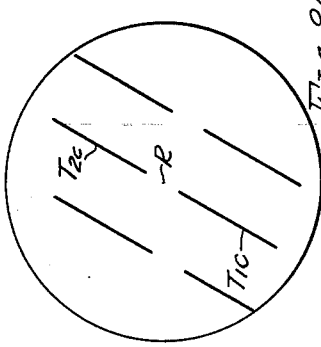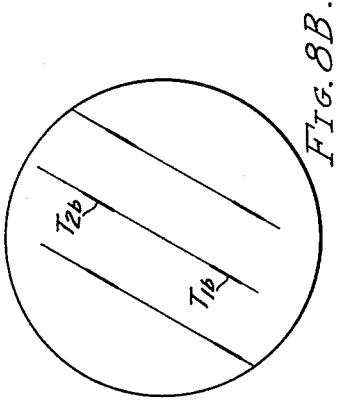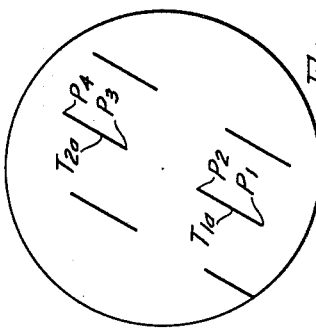

Oct. 4, 1960

R. C. LAWLOR 2,954,608

DRIFT AND GROUND SPEED INDICATOR

Filed Oct. 30, 1956

INVENTOR
Reed C. Lawlor

United States Patent Office 2,954,608
Patented Oct. 4, 1960

2,954,608

DRIFT AND GROUND SPEED INDICATOR

Reed C. Lawlor, Alhambra, Calif. (Park Central Bldg., 412 W. 6th St., Los Angeles 14, Calif.)

Filed Oct. 30, 1956, Ser. No. 619,347

41 Claims. (Cl. 33—46.5)

My invention pertains to navigation and more particularly to improved systems for determining ground velocity of an aircraft in flight. This application is a continuation-in-part of my copending application, Serial No. 558,165, filed October 11, 1944, and now abandoned, which in turn was a continuation-in-part of my patent application, Serial No. 365,981, filed November 16, 1940, now Patent No. 2,363,600.

In one prior art system of determining ground velocity of an aircraft in flight, an image of an earth object relative to which the aircraft is moving was focused on a plain frosted glass surface, and the rate at which the image traveled acoss the image area was measured to provide a basis for computing the ground speed. In conjunction with this system, the direction that the image traveled across the image area was measured to determine the drift of the aircraft. In this manner, the ground velocity both as to speed and direction was determined.

In another prior art system of measuring ground velocity, an element of an optical system used for focusing the image of an earth object in an image area on a plain frosted glass surface was rotated about a horizontal axis at a speed suitable for maintaining the image at a fixed point in the image area, and the speed of rotation of that element was used as a basis for computing the ground speed.

Such prior art methods of measuring ground velocity suffer from two principal disadvantages. In the first place, measurement of ground velocity in such systems depends for its success upon good visibility of the ground, and, secondly, in using such systems the observer is required to devote his full attention to the measurement for a considerable period during which his attention to his other duties, such as the piloting of the aircraft, is impaired.

The principal object of my invention is to provide a system for determining ground velocity which is free of the inconveniences, and other limitations of prior art systems.

Another object of my invention is to provide a ground velocity meter in which there is produced an image pattern comprising simultaneously observable image points and having a dimension corresponding to the ground speed.

Another object of my invention is to provide a ground velocity meter in which there is produced an image pattern having a dimension proportional to the ground speed of an aircraft regardless of the aircraft's altitude.

Another object of my invention is to provide a ground velocity meter in which an image pattern indicative of ground velocity is formed on a screen capable of retaining an image thereon for an appreciable period of time.

Another object of my invention is to provide a ground velocity meter that periodically forms an image pattern indicative of the ground velocity of an aircraft.

Another object of my invention is to provide means for erasing from an image area of a ground velocity meter a persistent image pattern indicative of ground velocity.

Another object of my invention is to provide a ground velocity meter in which energy successively received from an earth object is converted into a corresponding succession of simultaneously observable spaced images.

Another object of my invention is to provide a ground velocity meter which automatically presents a succession of ground velocity indicating image patterns in an image area, and which includes means for suspending the automatic presentation thereof so that one of the image patterns may be retained therein to facilitate its measurement.

Another object of my invention is to provide an arrangement for presenting an image pattern indicative of ground velocity for observation or measurement when desired.

Still another object of my invention is to provide a ground velocity meter with a screen formed of a material having a characteristic which may be repeatedly changed in one direction by exposure to radiation from an earth object and in the opposite direction by exposure to energy from another source.

Still another object of my invention is to provide a ground velocity indicator which is mounted directly on the instrument panel of an aircraft in such a position that it may be readily viewed by the pilot.

Still another object of my invention is to provide an avigational instrument based on television principles suitable for the measurement of ground velocity.

And still another object of my invention is to provide an improved image converter having a screen capable of retaining an image thereon for an appreciable period of time and having an electrical shutter for timing the exposure of that screen.

A further object of my invention is to provide an avigational instrument for determining ground velocity even in foggy or cloudy weather.

A further object of my invention is to provide a navigation instrument with a screen on which images of the earth may be retained selectively either for a relatively short time or for a relatively long time.

A further object of my invention is to provide an arrangement for generating pulses or waves at a frequency proportional to the altitude of an aircraft.

And still a further object of my invention is to provide a reliable avigational instrument with which ground velocity may be determined with rapidity and ease.

My invention, together with the foregoing and other objects and features of advantage may be more readily understood by reference to the following description taken in conjunction with the accompanying drawings, wherein Fig. 1 in a schematic diagram utilized in explaining the relations between air velocity, wind velocity, ground velocity, ground speed, and drift;

Fig. 2 is a plan view, partly in section and partly schematic, of one form of my ground velocity meter;

Fig. 3 is a partly schematic vertical sectional view of this velocity meter taken on the line 3—3 of Fig. 2;

Fig. 4 is a diagrammatic view of another ground velocity meter utilizing a shutter to control the time of exposure of a phosphorescent screen;

Fig. 5 is an elevational view of a cam element of the ground velocity meter of Fig. 4;

Figure 10:
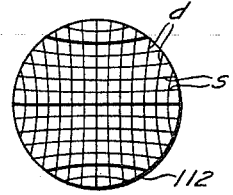
Figure 9:
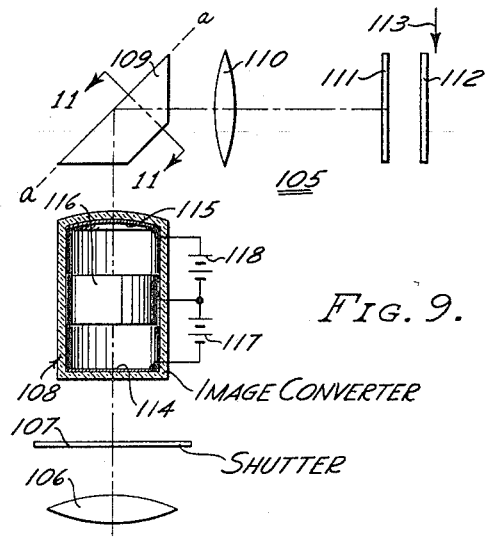
Figure 13:
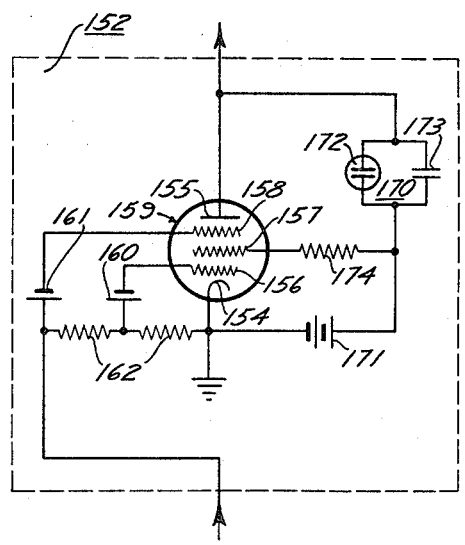
Figure 11:
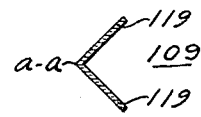
Figure 12:
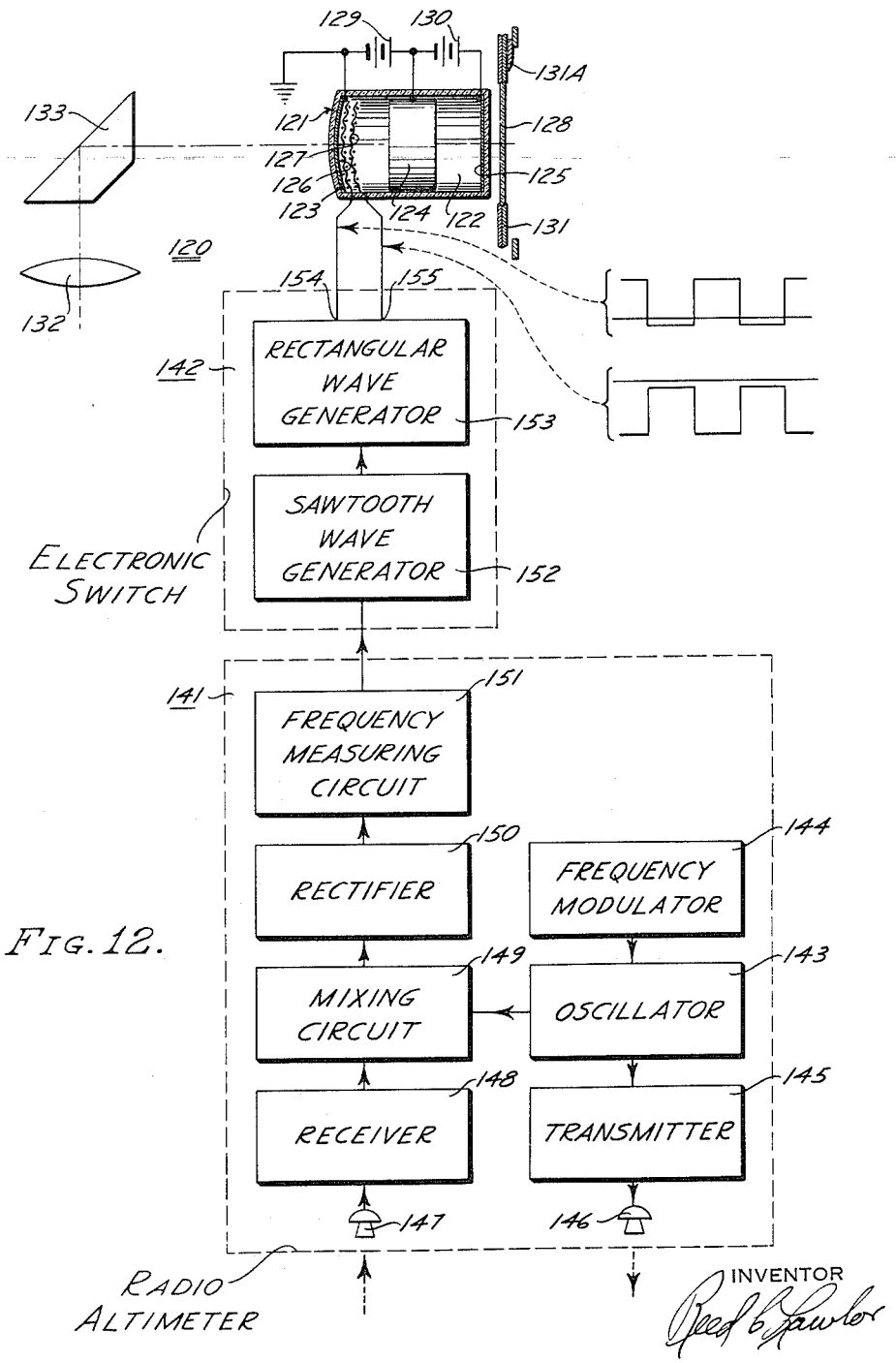
Figure 14:
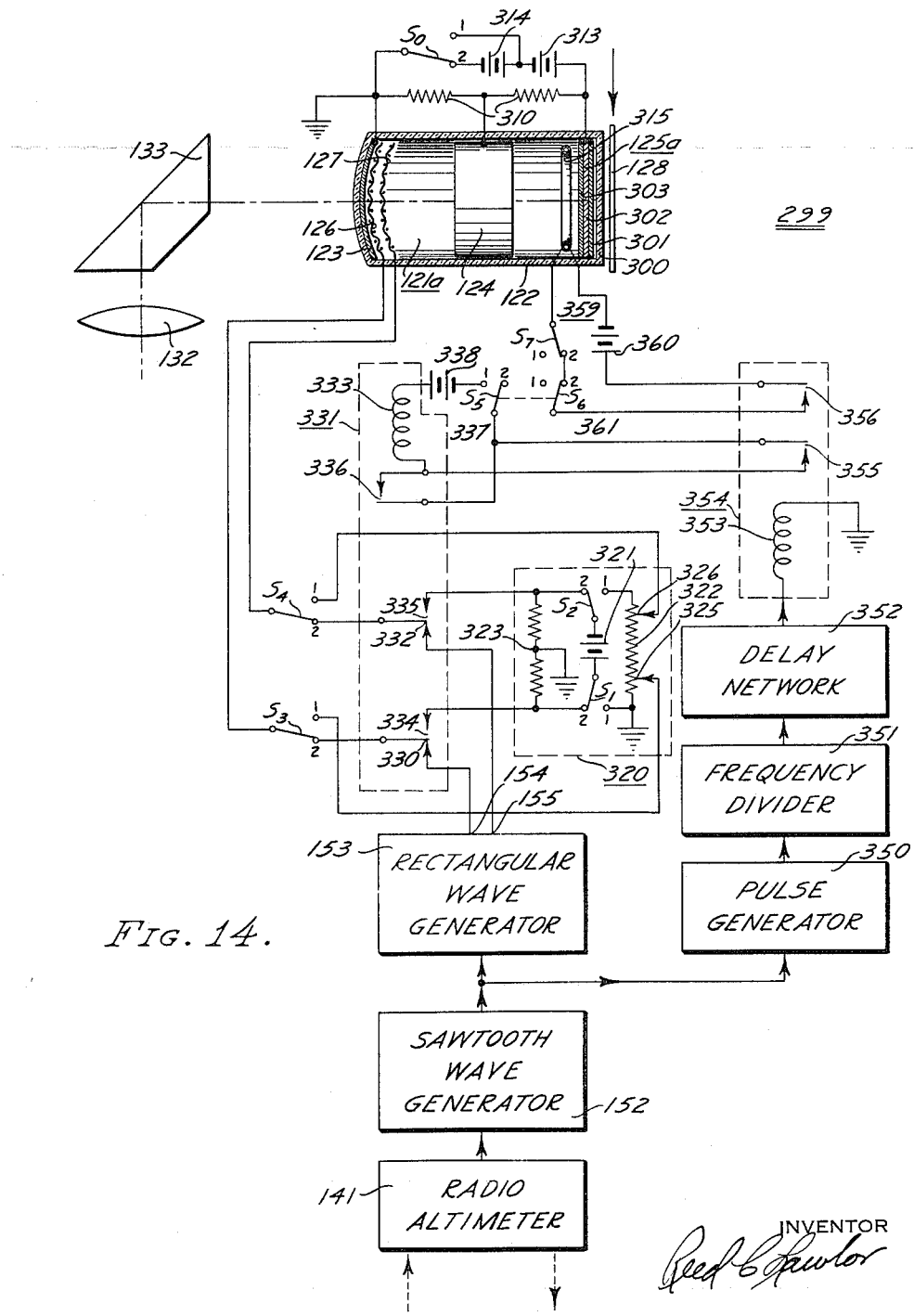

Figs. 6, 7, and 8 are schematic diagrams used to explain the relationship between the dimensions of the shutter of the ground velocity meter illustrated in Fig. 4 and the types of image patterns that may be produced therewith;

Fig. 9 is a schematic diagram, partly on section, of a ground velocity meter utilizing an electronic image translating system;

Fig. 10 is an elevational view of the measuring disc used in the ground speed meter of Fig. 9;

Fig. 11 is a sectional view of an image inverting reflector taken on the line 11—11 of Fig. 9;

Fig. 12 is a schematic diagram, partly in section, of a ground velocity meter utilizing a radio altimeter to control the time of exposure of the image screen;

Fig. 13 is a wiring diagram of a sawtooth wave generator used in conjunction with a radio altimeter to control the image exposure time; and Fig. 14 is a schematic diagram of a modified form of the ground velocity meter of Fig. 12.

Briefly stated, in one preferred form of my invention, energy from an earth object is received at successive instants at an aircraft in flight, the energy so received is converted into a corresponding succession of simultaneously observable spaced image points in an image area, thus forming therein an image pattern having a dimension corresponding to the speed of the aircraft relative to the object, and this dimension of the image pattern is measured to determine the speed of the aircraft relative to the ground. In order to form an image pattern having a dimension proportional to the ground speed independently of the altitude, a plurality of simultaneously visible images are formed on a viewing screen, from energy received from an earth object at intervals proportional to the altitude. More specifically, a phosphorescent or persistently fluorescent screen is exposed to an image of the earth for a limited measured time, and the length of the resultant streaks or traces formed on the screen is measured to determine the ground speed. In a more preferred embodiment of the invention, a linear image pattern is formed on the screen in an orientation thereon corresponding to the drift angle. In this case, the angle that this image pattern makes with a reference line fixed in the image area is measured to determine the drift angle and a linear dimension of the image pattern is measured to determine ground speed, thus determining both the drift and the speed components of velocity. Preferably a visible image of the terrain over which an aircraft is flying is formed by translating an invisible radiant energy image of earth objects, preferably infrared or ultra-violet images, into a visible phosphorescent or persistently fluorescent image pattern, and this pattern is measured to determine ground velocity. The screen employed for my purpose is composed of a material that is capable of being changed in one direction to form a fugitive image that can be retained thereon for a period that is long compared with the persistence time of vision and is capable of being restored to erase the image. Thus images successively formed on the screen and retained for such a period may be readily observed and measured even while they are decaying in intensity, and they may then be erased to prepare the screen for the formation of new images. The change in one direction may be induced in many ways, such as by exposure of the screen to selected light rays or to an electron beam, and the restoration of the screen may be induced by exposure of the screen to different selected light rays.

In this specification, the term "persistent fluorescence" is used to signify any fluorescent phenomenon which continues after the primary stimulating radiation is removed, and the term "fugitive" is applied to persistent fluorescent images which are of an impermanent character lasting for only a short time, such as a few seconds to a few minutes. While it is not desired to draw a sharp distinction between the term "persistent fluorescence" and the term "phosphorescence," the latter term also is applied to persistent fluorescent phenomena which last for a much longer time. In either event, an image formed on a screen composed of a phosphor which is persistently fluorescent or phosphorescent, persists for a period, such as a few seconds or a few minutes, that is long compared with the persistence time of vision, that is the maximum interval of about 1/20 second normally occurring between successive pictures to avoid flicker in motion pictures or television projection.

Referring directly to Fig. 1, there is shown an aircraft 1 in the floor of which is mounted a ground velocity meter 3 of the type illustrated in Figs. 2 and 3. The vector diagram shown in Fig. 1 illustrates diagrammatically the manner in which the velocity of the aircraft 1 with respect to the air $V_A$ and the wind velocity $V_W$ combine to produce a still different velocity of the aircraft with respect to ground $V_G$. In general, as a result of the combined action of the wind velocity $V_W$ and the air velocity $V_A$, the ground speed differs from the air speed, and the direction of travel of the aircraft with respect to the ground deviates from the longitudinal axis $x$—$x$ of the aircraft by an angle $\alpha$ known as the drift angle. To an observer looking vertically downward from the aircraft, objects on the ground appear to travel in the direction of the arrow 2, having the same direction as the ground velocity $V_G$ but in the opposite sense.

In the ground velocity meter illustrated in Figs. 2 and 3, a viewing screen formed of a suitable persistently fluorescent material is continuously exposed to an optical infra-red radiation image of the earth's surface, and the screen is periodically exposed substantially uniformly to ultra-violet radiation from a local source. Preferably, the screen is exposed to ultra-violet radiation from the local source at intervals proportional to the altitude of the aircraft above the earth's surface. In this ground velocity meter, a linear image pattern is produced on the viewing screen having a characteristic dimension proportional to the ground speed and forming an angle with respect to a datum line equal to the drift angle. This linear dimension and this angle are measured to determine the ground speed and drift angle respectively, thus completely determining the velocity of the aircraft with respect to the ground.

Preferably, a persistently fluorescent material is utilized in the viewing screen of this ground velocity meter which has a decay characteristic such that each image point forms a readily perceptible image pattern on the screen extending at least half-way across the fluorescent image area, and the screen is exposed to ultra-violet radiation at time intervals less than about half that required for such an image point to travel across the image area. Fluorescent materials of widely varying time decay characteristics are well known in the art and need not be specifically described here. The particular material selected will depend upon many other factors contributing to the design of the ground speed indicator, as will be apparent hereinafter.

Referring directly to Figs. 2 and 3, this ground speed meter 3 comprises a cylindrical housing or tube 7 supported vertically in the floor 8 of an aircraft by means of screws 9—9. An objective lens 10 smaller in diameter than the tube 7 and having a normally vertical optical axis is mounted at the bottom end of the tube 7. A filter 11 adapted to pass only infra-red rays is mounted in the tube above the lens 10 in any suitable manner. Around and above the lens 10 and filter 11 is mounted an ultra-violet ray tube 12. At the uppermost end of the tube 7 there is mounted a fluorescent viewing screen 13 comprising a first glass disc 14 carrying a thin layer 15 composed of a suitable fluorescent material on the lower side thereof, preferably in coincidence with the focal plane of the lens 10 to produce sharp image patterns. Above the viewing screen 13 is rotatably mounted a glass measuring disc 16 having a set of opaque rectangular grid lines on one side thereof, preferably on the lower side, to reduce parallax to a small amount. The rectangular grid lines on the measuring disc 16 include a set of drift, or lubber, lines $d$ extending in one direction and a set of speed measuring lines $s$ extending transversely thereto, the drift lines d all being of equal width, and the speed measuring lines s being arranged in sets of five, every fifth line being wider than the others to facilitate measurement. At the top of the tube 7 is mounted a glass cover plate 20 providing an instrument face which serves to keep dust et al., out of the instrument.

The rotatable measuring disc 16 is secured to an annular ring 21 having a worm gear 22 on the outer edge thereof and rigidly secured thereto. The ring 21 is rotatably confined at the side, top, and bottom thereof by means of bearing surfaces 23. The direction that the drift lines d form with the axis x—x of the aircraft 1 may be varied by rotation of a high pitch worm 24. The worm 24 is mounted on a horizontal shaft 25 passing tangentially through the rear side of said housing 7 at the upper end thereof at a point of the circumference of the housing 7 directly in front of the navigator or pilot. The shaft 25 has a manually operable knob 26 on the outside and thereof for rotational adjustment of the drift lines d. An index mark 29 is provided on a collar 30 fixed to the tube 7 in any convenient manner. Preferably the index mark 29 lies on a diameter of the collar 30 parallel to the axis x—x of the aircraft. The rotatable annular ring 21 on which is mounted the measuring disc 16 is indexed in degrees by a scale 28 on the portion of the uppermost surface thereof which passes adjacent the index 29. When the drift lines d are parallel to the longitudinal axis x—x of the aircraft, the zero angle reading is directly in line with the index mark 29. When the drift lines are inclined to the longitudinal axis x—x of the aircraft, the drift angle is read on the part of the scale 28 in lines with the index mark 29.

Current is automatically supplied intermittently to the ultra-violet ray tube 12 from a battery 40 by periodically closing a switch 41. The switch 41 is automatically closed periodically by means of a cam 42 driven by a variable speed motor 43. Preferably the speed of the motor 43 is automatically varied inversely as the altitude of the aircraft above the ground. This is accomplished, for example, by varying the voltage applied to the field winding 44 of the motor 43 by automatically varying the resistance of a rheostat 45 in series with the field winding 44 and a motor power supply represented by a battery 46 in accordance with the altitude. In the present instance, this control is effected automatically by means of a barometric altimeter 47 having a flexible diaphragm 48 which is displaced from a standard position an amount corresponding to the altitude and which operates through a linkage 49 including a pivoted sliding contact arm 50 to vary the resistance of said rheostat 45 in an appropriate manner. A scale 51 associated with a pointer 52 on the arm 50 indicates the altitude. If desired the speed of the motor 43 may be controlled by manually setting the resistance of the rheostat 45 to correspond to the altitude whenever it is desired to measure ground velocity. In any event during each revolution of the cam 42, the switch 41 is closed momentarily thereby exposing the fluorescent viewing screen 13 to ultra violet radiation from the ultra-violet ray tube 12 substantially uniformly for a short interval of time. During this operation an infra-red image from the earth's surface is continuously focused by the lens 10 through the filter 11 on the screen 13. Infra red images of earth objects formed in the image area at the screen 13 travel thereacross at a rate proportional to the ground speed $V_G$ of the aircraft.

The fluorescent material incorporated in the layer 15 is preferably of the persistently fluorescent or phosphorescent type which exhibits an acceleration of decay rate when exposed to infra-red radiation. In the absence of any infra-red radiation from the earth, the periodic exposure of the screen 13 to ultra-violet radiation brings the intensity of its fluorescence up to a standard maximum intensity less than the saturation intensity to which the screen is capable of being excited. And in the absence of infra-red radiation during the time when the fluorescence of the screen 13 is decaying in the interval between exposures to the ultra-violet radiation, the intensity of fluorescence of the screen 13 decays in a regular hyperbolic or exponential manner. However, as an infra-red image point travels across the image area, the points on the screen 13 exposed thereto are successively darkened. Because the intensity of fluorescence depends upon the recent history of the fluorescent material in the layer 15, the trace produced on the screen 13 along the path traveled by an infra-red image varies in intensity in a regular manner between those points p on the screen at which the infra-red image is focused at the instant of exposure to the ultra-violet radiation. Thus, a linear image pattern is produced on the screen 13 as each infra-red image travels thereacross. A characteristic dimension of this image pattern such as the distance between successive points p thereof corresponds to the ground speed of the aircraft, and the angle that this linear image pattern forms with the longitudinal axis of the aircraft is equal to the drift angle. After an image pattern is thus produced, it fades away, due partially to the decay of the fluorescence of the screen 13 and partially to the partial erasing effect of subsequent exposures of the screen to ultra-violet radiation, and new image patterns are formed on the screen directly over the old fading image patterns.

Generally speaking the ground speed of the aircraft is given by the formula $$s=\frac{lh}{ft}$$

where l is the characteristic dimension of the image pattern, h is the height of the aircraft above the surface, f is the focal length of the lens 10, and t is the time interval between successive exposures of the screen 13 to ultra-violet radiation. When the speed of the motor 43 is varied inversely as the altitude of the aircraft above the surface of the earth, the time interval between exposures of the screen to ultra-violet radiation is proportional to the altitude, and the characteristic length of the image pattern is proportional to the ground speed of the aircraft and independent of the altitude.

In order to measure the velocity of the aircraft, the measuring disc 16 is rotated to bring the drift, or lubber, lines d into position parallel to the traces produced on the fluorescent image screen 13 as shown in Fig. 2. The angle that the measuring disc 16 is rotated from its normally longitudinal position is read from the angular scale 28 on the measuring disc 16 to determine the drift angle, and the distance between distinct intensity changes in one of the linear images is estimated by means of the speed lines s to determine the ground speed. In this manner, the ground velocity of the aircraft is determined from time to time during flight.

It is clear, of course, that the above described form of my invention may be utilized for determining ground velocity even under unfavorable weather conditions, because of the fact that infra-red radiation, at least partially, penetrates fog and clouds, especially when such fog and clouds have been but newly formed and consist of but small particles of water vapor.

In a modification of the invention hereinabove described in connection with Figs. 2 and 3, a viewing screen formed of a suitable persistently fluorescent material is continuously exposed to an optical ultra-violet radiation image of the earth's surface, and the screen is periodically exposed substantially uniformly to infra-red radiation from a local source. In this case the screen is exposed to the infra-red radiation from the local source at intervals proportional to the altitude of the aircraft above the earth's surface, so that a linear image pattern is produced on the screen in a manner similar to that hereinabove described, the image pattern again having a linear dimension proportional to the ground speed and again forming an angle with respect to a datum line equal to the drift angle. This modification of my invention is particularly suitable for use in case the aircraft is to be flown only in daylight when the visibility is good. In this case, the ground speed indicator of Figs. 2 and 3 is provided with a lens 10 (or lens 10 and filter 11) which transmits only short wave length radiation in the range comprising say, ultra-violet, violet, and blue light; the ultra-violet ray tube 12 is replaced by an infra-red ray tube and discs 14 and/or 16 and/or cover plate 20 are formed of a material which permits the transmission therethrough of only long wave length visible light. Such an infra-red tube may comprise for example, a ruby glass envelope containing a mixture of argon and neon at low pressure. The infra-red tube may also be in the form of an incandescent lamp, having an envelope composed of ruby glass or other material that selectively transmits infra-red radiation and absorbs visible and ultra-violet radiation. With the system thus modified and thus provided with complementary light filters on opposite sides of the fluorescent layer 15, that is with a short wavelength filter on the object side and a long wavelength filter on the viewing side thereof, the only image seen on said screen comprises the fluorescent image pattern produced by exposure of the layer to short wavelength radiation from the earth's surface. The orientation and a dimension of this image pattern are measured in the manner hereinabove described to determine the ground velocity of the aircraft.

In a practical ground velocity meter illustrated diagrammatically in Fig. 4 and embodying features of the present invention, a viewing screen formed of a suitable phosphorescent material is periodically exposed at regular intervals to an optical infra-red radiation image of the earth's surface to produce an image pattern on the screen having a linear dimension corresponding to the ground speed and forming an angle with respect to a datum line equal to the drift angle. The viewing screen is also periodically exposed momentarily at longer intervals to ultra-violet radiation which completely erases the image pattern previously formed thereon. Preferably the screen is exposed to the infra-red radiation image periodically at intervals proportional to the altitude of the aircraft above the earth's surface. In this case a linear image pattern comprising a series of aligned image traces is formed on the screen corresponding to each outstanding infra-red radiating earth object, these traces having lengths proportional to the ground speed and being separated by blank spaces proportional to the ground speed. One of the linear dimensions of such a linear image pattern and the angle that the image pattern forms with respect to a reference line are measured to determine ground speed and drift, respectively, thus completely determining ground velocity.

The ground velocity meter of Fig. 4 comprises an optical system of the type previously described in connection with Figs. 2 and 3 and comprises in addition, a shutter which is operated by an altimeter to control the exposure of the viewing screen to an image of the earth, an erasing mechanism for periodically completely erasing an image pattern from the viewing screen, and means for arresting the operation of the shutter and the erasing mechanism to facilitate measuring the image pattern. More particularly, this ground velocity meter 55 includes an optical system 9 comprising a lens 10, a filter 11, a tubular ultra-violet light source 12 of substantially circular longitudinal shape, a phosphorescent viewing screen 13 comprising a glass disc 14 carrying a thin layer 15 composed of a suitable phosphorescent material, and a measuring disc 16 having a rectangular measuring grid marked thereon. The elements mentioned of the optical system are arranged in spaced-apart relation in substantially parallel planes along the vertical optical axis of the ground velocity meter from the bottom to the top thereof in the order named. The phosphorescent layer 15 is disposed in the focal plane of the lens 10. The ultra-violet light source 12 is included in series with a battery 40 and a switch $S_1$.

This ground velocity meter 55 comprises an exposure control system 59 including a variable speed motor 60 to which power is supplied from a battery 61 through a rheostat 62 which is controlled by a barometric altimeter 63 in the same manner as the motor 43 previously described in connection with Figs. 2 and 3. The exposure control system 59 also includes a vertical shaft 70 having its axis parallel to the axis of the optical system adapted to be rotated in a clockwise direction by the variable speed motor 60 through a cone clutch 71 at the upper end thereof. The shaft 70 carries a sectored shutter 72 which is rigidly secured thereto intermediate the ends thereof. The shutter 72 comprises two sectors 73 and 74 arranged symmetrically on the shaft 70 in a plane perpendicular to the axis of the shaft 70, preferably in a plane between the lens 10 and the ultra-violet light source 12. As the shutter 72 rotates the sectors 73 and 74 successively intercept the optical paths of infra-red radiation transmitted through the lens 10 toward the screen 14. Thus, as the shutter 72 rotates, the entrance aperture of the optical system 9 is effectively closed by each of the sectors 73 and 74 once during each revolution of the shaft 70 and the aperture of the optical system 9 is effectively open when the angular openings 75 and 76 between the sectors 73 and 74 include such optical paths. The optical system 9 is thus rendered alternately effectively transparent and opaque twice in each revolution of the shaft 70.

The shaft 70 also carries a cam 85 adjacent the upper end thereof below the clutch 71. The cam 85 comprises a horizontally disposed wheel having a rim 86 which carries first and second crown elements 88 and 89 on the upper side thereof. A first compression spring 90 arranged at the lower end of the shaft 60 is compressed against the end of the shaft 70 thereby normally urging the shaft 70 upward into its upper position where the clutch 71 is engaged. The first crown cam element 88 comprises a gradually inclined portion 91 on the leading side thereof and a semi-circular cam notch 92 at the uppermost part thereof, as illustrated in Fig. 5. A control mechanism 93 is provided that cooperates with the first crown cam element 88 to lower the shaft 70 against the force of the first compression spring 90 to its lower position to disengage the clutch 71 and to stop the rotation of the shaft 70 at a predetermined point in its rotation. When the shaft 70 is thus stopped, the sector 73 of the shutter 72 effectively closes the aperture of said optical system 9 rendering it effectively opaque. The control mechanism 93 includes a vertically movable rod 94 and an operating arm 95 pivotally attached thereto positioned along a vertical line above the cam 85. The rod 94 is arranged to slide in lower and upper fixed sleeves 96 and 97 along a vertical line parallel to the shaft 70 by manipulation of the operating arm 95. The rod 94 is provided with a cam wheel 99 at the lower end thereof adapted to engage the first cam element 88. A second compression spring 100 enclosing the rod 94 between the lower sleeve 96 and a collar 98 rigidly secured to the rod 94 normally urges the rod 94 upward. The operating arm 95 is arranged in a loose fitting guide 101 to permit the operating arm 95 free movement in a vertical plane. The operating arm 95 is adapted to force the rod 94 downward against the pressure of the second spring 100 to a lower position where it may be retained by means of a catch device 102 comprising a pin 103 on the operating arm and a fixed U-shaped stop 104 having a notch on the lower side of each arm thereof. The rod 94 is returned to its upper position by pressing the operating arm 95 slightly downward and forward unlatching the catch device and then releasing the operating arm 95 permitting the second compression spring 100 to force it upward.

When the rod 94 is disposed in its upper position the cam wheel 99 does not interfere with the rotation of the cam 85. However, when it is disposed in its lower position, the cam wheel 99 engages the first crown cam element 88 during the rotation of the shaft 70. Thus, when the rod 94 is lowered while the shaft 70 is rotating, the cam wheel 99 engages the inclined portion 91 at the leading edge of the first crown element 88 causing the shaft 70 to be lowered against the upward pressure of the first compression spring 90, and thus disengages the elements of the cone clutch 71. When the shaft 70 rotates a little farther, the cam wheel 99 encounters the cam notch 92 on the first crown cam element 88 and the first spring 90 urges the shaft 70 upward, causing the cam notch 92 to seat against the cam wheel 99 and braking the rotation of the shaft 70. While the cam notch is thus seated on the cam wheel 99 the elements of the cone clutch 71 remain disengaged and the shutter 72 remains in its closed position. In order to resume rotation of the shaft 70, the rod 94 is moved to its upper position as hereinabove explained permitting the cam wheel 99 to be withdrawn from the cam notch 92 and thus permitting the elements of the cone clutch 71 to be re-engaged. It is to be noted that when the catch device is released both the first and second compression springs 90 and 100 cooperate to urge the vertical shaft 70 and the rod 94 upward.

The second crown cam element 89 is arranged to automatically close the switch $S_1$ once in each revolution of the shaft 70. When switch $S_1$ is closed, current is supplied to the ultra-violet light source 12 from the battery 40. The closing of the switch is synchronized with the operation of the shutter 72 so that the layer 15 of phosphorescent material is exposed to ultra-violet radiation from the ultra-violet source 12 once in each revolution of the shaft 70 shortly after the first cam element 88 passes the cam wheel 99 and just prior to the opening of the optical system 9.

In operation, when the shaft 70 rotates and the switch $S_1$ is closed by action of the cam 85 while the shutter 72 is in its closed positions no infra-red radiation from the earth is transmitted to the phosphorescent screen 13 and the ultra-violet radiation from the ultra-violet light source 12 exposes the phosphorescent screen 13 substantially uniformly over its surface, exciting the phosphorescent material contained thereon, and thereby effectively erasing any image pattern that may previously have been formed thereon. Shortly after the switch $S_1$ opens, the shutter 72 opens, permitting the lens 10 to focus infra-red images of earth objects on the phosphorescent coating 15. As these images move across the screen 13 in a direction corresponding to the drift of the aircraft and at a speed corresponding to the ground speed of the aircraft, they cause dark traces to be formed thereon and as the sectors 73 and 74 of the shutter 72 alternately intercept the infra-red radiation from the earth, a linear image pattern is formed on the screen 13 comprising dark spaced apart and aligned traces. The linear image pattern corresponding to a single infra-red radiating earth object comprises a series of collinear straight traces having lengths proportional to the ground speed and separated by gaps proportional to the ground speed.

In order to determine the ground velocity of the aircraft, the rotation of the shutter 72 is arrested, effectively closing the optical system 9 and causing an image pattern to be retained on the viewing screen 13. With the image pattern thus retained, the angle that the linear image pattern forms with the longitudinal axis of the aircraft is measured to determine drift, and one of the linear dimensions of the image pattern is measured to determine speed by suitable manipulation of the measuring disc 16 as hereinabove set forth. While the lengths of any of the lines or the length of any of the gaps in one of the linear image patterns may be measured, it is preferable to measure the distance between similarly located points in consecutive traces as explained more fully hereinbelow.

Figs. 6A, 6B, and 6C illustrate three different arrangements of sectored shutters 72A, 72B, and 72C respectively, of the shutter 72, hereinabove described; Figs. 7A, 7B, and 7C illustrate the corresponding variations in percentage of light transmitted through the lens 10 to the phosphorescent viewing screen 13 during a cycle of operation between successive instants when the switch $S_1$ is closed; and Figs. 8A, 8B, and 8C illustrate the corresponding linear image patterns produced on the viewing screen 13.

In the arrangement illustrated in Fig. 6A, the shutter 72a comprises two ninety-degree sectors 73a and 74a separated by two ninety-degree open spaces 75a and 76a. As the shutter 72a rotates, it opens and closes the aperture associated with the lens 10, causing light transmitted through the lens to be alternately focused on the phosphorescent layer 15 and to be alternately intercepted by the shutter sectors 73a and 74a for equal intervals. The resultant variation in percentage transmission of the optical system 9 is illustrated in Fig. 7A, where abscissae represent time and ordinates represent the percentage of light passing through the lens which is transmitted to the phosphorescent screen 13. More particularly, referring to Fig. 7A, and considering a cycle of operation beginning at the instant when the middle of the sector 73a covers the lens 10 intercepting all the light, after the shutter rotates a small angle the switch $S_1$ is closed and the phosphorescent coating 15 is exposed to ultra-violet light, erasing the image pattern previously formed thereon. As the rotation of the shutter 72a proceeds, the open space 75a between the shutter sectors 73a and 74a becomes aligned with the lens 10, thus permitting all of the radiation passing through the lens 10 and filter 11 to be transmitted to the phosphorescent screen 13, as indicated by the portion $K_a$ of the graph. As the rotation of the shutter 72a proceeds farther, the other sector 74a becomes aligned with the lens 10, intercepting the beam and reducing the intensity of the light passing through the lens 10 to the phosphorescent screen 13 to zero, as indicated by the portion $L_a$ of the curve. As the rotation of the shutter 72a continues, the second open space 76a between the two sectors 73a and 74a becomes aligned with the lens 10 and all of the light passing through the lens 10 and filter 11 is again transmitted to the phosphorescent screen 13 as indicated by the portion $M_a$ of the curve. When the first sector 73a again becomes aligned with the lens 10, the intensity of light falling on the phosphorescent screen 13 is again reduced to zero, as indicated by the portion $N_a$ of the curve.

During the interval corresponding to the portion $K_a$ of the curve, an infra-red radiating object from the earth is projected onto the screen 13, the image traversing a path on the screen 13 beginning at $P_1$ and ending at $P_2$ forming a first dark trace $T_{1a}$ thereon and during the interval corresponding to the portion $M_a$ of the curve, the infra-red radiating object from the earth is again projected onto the screen 13, the image traversing a path beginning at point $P_3$ and ending at point $P_4$, forming a second dark trace $T_{2a}$ thereon, the two dark traces $T_{1a}$ and $T_{2a}$ being collinear and forming a linear image pattern on the screen as illustrated in Fig. 8A. If the period during which light is transmitted through the lens 10 and filter 11 to the phosphorescent screen 13 equals the period during which no light is transmitted therethrough, the length of the gap between the traces $T_{1a}$ and $T_2$ equals the length of each trace $T_{1a}$ and $T_{2a}$. Similar linear image patterns are likewise produced at other parts of the screen 13 along the paths traversed by images from other infra-red radiating earth objects, all of the linear image patterns thus formed being parallel and forming a single composite linear image pattern on the screen 13.

In order to determine ground velocity, the rotation of the shutter 72a is arrested and an image pattern retained on the viewing screen 13 by operation of the control mechanism 93 in the manner hereinabove set forth. The drift indicating lines d of the measuring disc 16 are then aligned with the traces $T_{1a}$ and $T_{2a}$ and the drift angle measured. And then a characteristic dimension of the image pattern such as the length of one of the traces $P_1P_2$ or $P_3P_4$ or the distance between them $P_2P_3$ or the distance from the beginning of the first trace to the end of the second $P_1P_4$ or more preferably, the distance between the beginnings or endings of the two traces $P_1P_3$ or $P_2P_4$ is measured by means of the speed indicating lines s on the measuring disc 16.

In the arrangement illustrated in Fig. 6B, there is shown a similar shutter 72b comprising two sectors 73b and 74b extending over equal large obtuse angles and separated by equal openings 75b and 76b extending over equal small acute angles complementary to said obtuse angles. In this arrangement the radius of the shutter 72b is preferably such that the aperture of the lens 10 is never entirely closed during the rotation of the shutter 72b, thus causing the percentage of transmitted light to vary during rotation between one hundred percent for a relatively short time and a smaller amount, say, ten percent for a relatively long time. With the arrangement here illustrated, all of the light is transmitted through the lens 10 and filter 11 to the phosphorescent screen 13 for relatively short periods, indicated by the portions $K_b$ and $M_b$, and only a small amount of light is transmitted to the phosphorescent screen for the relatively long periods $L_b$ and $N_b$ as illustrated in Fig. 7B. In this case, the image of an infra-red radiating object traversing the screen produces dark linear traces extending thereacross with two short darker spots $T_{1b}$ and $T_{2b}$ thereon produced at the instants corresponding to the maximum transmission of infra-red radiation to the screen 13 as illustrated in Fig. 8B. In this case, the drift angle is measured in the manner hereinabove explained, and the speed is determined by measuring the distance between the centers of the darker spots $T_{1b}$ and $T_{2b}$ in one of the linear traces.

In the arrangement illustrated in Fig. 6C, there is shown still another similar shutter 72c comprising two shutter sectors 73c and 74c extending over equal small acute angles and separated by equal openings 75c and 76c extending over equal large obtuse angles complementary to said acute angles. In this arrangement the radius of the shutter 72c is preferably such that the aperture of the entire lens 10 is periodically closed during the rotation of the shutter 72c, thus causing the percentage of transmitted light to vary during rotation between one hundred percent for a relatively long time, and zero for a relatively short time. With the arrangement here illustrated, all of the light is transmitted through the lens 10 and filter 11 to the phosphorescent screen 13 for relatively long periods, indicated by the portions $K_c$ and $M_c$ and no light is transmitted to the phosphorescent screen 13 for the relatively short periods $L_c$ and $N_c$. In this case, the image of an infra-red radiating object traversing the screen produces two dark linear traces $T_{1c}$ and $T_{2c}$ extending thereacross with a small blank space R therebetween produced at the instant $L_c$ corresponding to no transmission of infra-red radiation to the screen 13. In this case, the drift angle is measured in the manner hereinabove explained, and the speed is preferably determined by measuring the distance between the beginnings or ends of the traces $T_{1c}$ and $T_{2c}$.

By using a lens 10 composed of quartz, and a filter 11 which will transmit only ultra-violet radiation, and a light source 12 which is adapted to radiate only infra-red radiation, ultra-violet radiation images from the earth may be focused on the phosphorescent screen to produce excitation thereof during the intervals while the shutter is open and in this event linear image patterns of the type illustrated in Figs. 8A, 8B and 8C but comprising a series of collinear bright lines are formed on the phosphorescent screen, and these image patterns are periodically erased by the action of infra-red radiation from the light source 12. A linear dimension and the orientation of this image on the phosphorescent screen is also measured in the manner hereinabove explained to determine the ground velocity.

It is to be understood that the actual structure of the exposure control system 59 used for automatically timing the exposure of the image screen may be varied in many ways. Under some circumstances, for example, it will be desirable to utilize a shutter having a larger number of sectors or to regulate the speed of rotation so that the shutter completes several rotations during the period required for an image to travel across the viewing screen. In either of these cases image patterns comprising a larger number of aligned traces are obtained. Other types of shutters such as curtain or shutters of the Kerr cell type may also be used, such shutters having the advantage that they permit beginning and terminating image traces more sharply. Similarly other types of altimeters may be used, especially altimeters of the absolute type which have the advantage of requiring no adjustment to compensate for the altitude of the terrain.

In the ground velocity meter illustrated in Fig. 9 and also embodying features of the present invention a photocathode of an image converter is periodically exposed to an optical image of the earth's surface, and resultant electron images formed at the photo-cathode are projected onto a screen coated with a persistently fluorescent or other suitable phosphorescent material to produce an image pattern on the screen having a linear dimension corresponding to the ground speed and forming an angle with respect to a datum line on the screen equal to the drift angle. This ground velocity meter 105 comprises an objective lens 106, a shutter 107, an image converter 108, an image inverting reflector 109, an erecting lens 110, a viewing screen 111 comprising, say, frosted glass, a measuring disc 112, and an index 113. Preferably the measuring disc 112 is of the type hereinabove described having a grid of lines thereon including drift or lubber lines and speed lines. However, in this case to compensate for distortion introduced by the image converter 108, the drift and speed lines d and s are slightly bowed as illustrated in Fig. 10.

In this ground velocity meter 105, radiant energy images of earth objects, preferably infra-red images are focused through the objective lens 106 onto a flat photo-cathode 114 of the image converter 108, and the period of exposure of the photo-cathode 114 to such radiant energy images controlled by means of the shutter 107 disposed between the objective lens 106 and the photo-cathode 114 of the image converter 108. Electrons emitted at various points of the photo-cathode 114 in proportion to the intensity of the light incident thereon are focused on a fluorescent anode or image screen 115 by virtue of the electron focusing properties of an electron lens 116 formed by a cylindrical electrode positioned coaxially between said photo-cathode 114 and said fluorescent anode 115. The focusing properties of such an image converter 108 and the intensity of the image formed are determined, in part, by the geometry of the system and the potentials of batteries 117 and 118. The intensity of the fluorescent image may, in general, be increased by increasing said potentials proportionally.

In the particular embodiment of the invention here shown, the optical axis of the objective lens 106 and the axis of the image converter 108 are mounted on the aircraft in such a position as to be vertical in normal flight, and the erecting lens 110, the viewing screen 111, and the measuring disc 112 are mounted in planes substantially parallel to the surface of the aircraft instrument panel.

The reflecting means 109 which is utilized in order to direct the image pattern appearing on the image screen 115 may comprise a roof angle, or Amici, prism, but preferably comprises two light-weight front surface mirrors 119 forming a dihedral angle of ninety degrees, as shown in Fig. 11, with the line of intersection a—a of the mirrors 119 positioned in such a manner as to reflect the image pattern from the image screen 115 of the image converter 108 onto the viewing screen 111. By utilizing in the image screen 115 a material in which the fluorescence is relatively persistent, streaked images of earth objects are formed on the screen 115.

By opening the shutter 107 for a short time ($t$) of predetermined length, streaks of objects are formed on the fluorescent viewing screen 115 having limited lengths ($l$). In this case, the ground speed is given by $$s = \frac{lh}{mft}$$

where $h$ is the height of the craft above the surface as determined in any suitable manner, $f$ is the focal length of the objective lens 106, and $m$ is the overall magnification of the portion of the system following the focal plane of the objective lens 106. The shutter 107 may, if desired, be periodically opened and closed for different periods of time, wherein the open period and the closed period are equal or relatively long or short as desired, in the manner similar to that hereinabove described in connection with Figs. 7A, 7B, and 7C, thus causing corresponding linear image patterns of the general types illustrated in Figs. 8A, 8B, and 8C to be rendered visible on the viewing screen 112.

In this form of the invention, due to the action of the image inverting reflector 109 and the erecting lens 110, images of earth objects are disposed on the viewing screen 111 in the same relation to each other as they would appear to a pilot looking directly downward at the earth in his normal sitting position. Thus, in this case, during the formation of the image patterns of the types illustrated in Figs. 8A, 8B, and 8C, image points appear to move in a general downward direction across the field of view as long as the speed of the aircraft is greater than the speed of the head wind. On the other hand, if the head wind exceeds the air speed of the aircraft, thus causing the aircraft actually to travel backward relative to the earth, the image points formed on the viewing screen appear to move in a general upward direction across the field of view. Thus, by observing the direction in which the traces of the image pattern are formed on the viewing screen, the sense of motion of the aircraft with respect to earth objects may be determined. The angle that the traces make with the normal or vertical axis of the aircraft is the drift angle $\alpha$. This angle is measured by rotating, in any convenient manner, drift or lubber lines on a measuring disc 112 into a position parallel to said streaks. The drift angle may be read from angular divisions marked on an angular scale attached to the measuring disc, and then the speed is determined by estimating the lengths of the traces with the aid of the speed lines on the measuring disc 112.

In the ground velocity meter illustrated in Fig. 12 and embodying features of the present invention an optical image of the earth's surface is projected onto the photo-cathode of an image converter and the resultant electron image formed at the photo-cathode is periodically projected onto a fluorescent anode in the image converter. In this case the periodic exposure of the anode to the electron image is controlled automatically with a radio altimeter.

More particularly, this ground velocity meter 120 utilizes an image converter 121 comprising a tubular envelope 122 having a convex photo-cathode 123 at one end thereof and a persistently fluorescent flat anode 125 acting as a viewing screen at the other end thereof, an electron lens 124 formed by a cylindrical electrode positioned coaxially between the photo-cathode 123 and the anode 124, and first and second control grids 126 and 127 respectively disposed between the photo-cathode 123 and the electron lens 124 preferably relatively close to the photo-cathode 123. The grids 126 and 127 are preferably in the form of thin wire mesh screens extending across the interior of the envelope 122 and arranged to intercept electron images produced at the photo-cathode 123 and projected toward the electron lens 124. The focusing properties of such an image converter 121 and the intensity of the image formed at the anode 125 are determined, in part, by the geometry of the system and the potentials of the batteries 129 and 130 connected respectively between the cathode 123 and the electron lens 124 and between the electron lens 124 and the anode 125.

The intensity of the image formed at the anode 125 is varied periodically in the present case by periodic application of suitable voltages to the control grids 126 and 127 in a manner more fully set forth hereinbelow. More particularly, by suitably controlling the biases on the control grids 126 and 127 the electron optical system is rendered effectively transparent or effectively opaque insofar as the projection of electron images from the photo-cathode 123 onto the fluorescent anode 125 is concerned. Thus the control grids 125 and 127 act as an electrical shutter in the electron optical system of the image converter 121, controlling, in effect, the transmission coefficient of the image converter 121.

This ground velocity meter 120 is provided with an objective lens 132 mounted in such a position that its optical axis is vertical in normal flight. The axis of the image converter 121 is substantially horizontal, readily permitting mounting the fluorescent viewing screen 125 substantially parallel to the surface of an aircraft instrument panel 131 carrying an index 131A. The reflecting means 133 which is utilized in order to direct the optical image from the lens 132 onto the photo-cathode 123 may comprise a roof angle, or Amici, prism but preferably comprises two light-weight front-surface mirrors forming a dihedral angle of ninety degrees, with the line of intersection a—a positioned in such a manner as to reflect the earth image onto the normally vertical photo-cathode 123.

In this ground velocity meter 120 radiant energy images of earth objects, preferably infra-red images, are focused by means of the lens 132 and image inverter 133 onto the photo-cathode 123 of the image converter 121. When the image converter 121 is effectively transparent, electrons emitted at various points on the photo-cathode 123 in proportion to the intensity of the light incident thereon are focused on the fluorescent anode 125 by virtue of the electron focusing properties of the electron lens 124. By utilizing in fluorescent anode 125 a material in which the fluorescence is relatively persistent, streaked images of earth objects are formed on the anode 125. A rotatable measuring disc 128 of the type hereinabove described and provided with suitable drift or lubber lines and with measuring lines is mounted adjacent and parallel to the anode 125.

By utilizing an image inverter 133 for reflecting the optical image onto the photo-cathode 123, the direction made by the streaks on the screen 125 as viewed by a pilot looking toward the instrument panel lies in the same direction in the field of view, as objects on the earth would appear to be moving, if the pilot looked directly downward at the ground beneath him while remaining seated in his normal forward-looking position. Thus the image inverter 133 simplifies the interpretation of the drift indications and facilitates the measurement of ground velocity.

The image converter 121 is rendered effectively transparent or opaque by applying suitable biases to the control grids 126 and 127, said biases being conveniently expressed in terms of the voltage applied to the grids 126 and 127 relative to the grounded photo-cathode 123. To render the image converter 121 effectively transparent, two relatively low negative biases are applied to the two control grids, thus permitting substantially all of the electrons emitted from the photo-cathode 123 to pass through these grids 126 and 127 through the electric lens 124 onto the anode 125; and to render the image converter 121 effectively opaque, the bias on the first control grid 126 adjacent the photo-cathode 123 is driven to a relatively high positive value and the bias on the second control grid 127 relatively remote from the photo-cathode 123 is driven to a relatively high negative value, thus preventing electrons from passing through the second grid 127 to the electron lens 124 and anode 125 and causing them to be collected on the first grid 126. The biases suitable for this purpose depend on the geometry of the image converter 121 and the voltage applied between the photo-cathode 123 and the electron lens 124.

By periodically rendering the image converter 121 alternately transparent and opaque by application of suitable biases to the control grids 126 and 127, the time interval during which the anode 125 may be exposed to electron images of earth objects, and the time interval during which it may be effectively shut off from exposure to electron images of earth objects, may be controlled in any manner desired. Furthermore the ratio of the periods of transparency and opacity may be made equal, large, or small in the manner hereinabove illustrated in connection with Figs. 7A, 7B, and 7C, thus causing linear image patterns of the general types illustrated in Figs. 8A, 8B, and 8C to be rendered visible on the viewing screen 125. Preferably, the periods of effective transparency and opacity of the image converter 121 are made proportional to the altitude of the aircraft in order to cause a dimension of the image pattern formed on the viewing screen 125 to be proportional to the ground speed independently of the altitude.

These periods during which the image converter 121 is transparent and the period during which it is opaque are preferably controlled automatically by means of an absolute altimeter such as a radio altimeter 141 which causes an electronic switch 142 to periodically apply suitable rectangular voltage waves at a frequency that varies inversely as the altitude to the control grids 126 and 127. The radio altimeter 141 comprises a radio frequency oscillator 143 which is controlled periodically by a frequency modulator 144 whereby the frequency of the signal produced by the oscillator 143 periodically varies as a linear function of time. The output of the oscillator 143 is applied through a transmitter 145 to a directional antenna 146 which directs high frequency radio waves downward in a direction parallel to the optical axis of the lens 132. Such radio waves are reflected from the earth's surface and returned to the aircraft, where they are picked up by a second directional antenna 147 having an axis parallel to the first direction antenna 146. The radio waves thus picked up are applied through the receiver 148 together with waves locally generated in the oscillator 143, to a mixing circuit 149. The received reflected wave and the locally generated wave differ in frequency in proportion to the altitude of the aircraft. The mixed wave is applied to a rectifier 150 which demodulates the mixed wave producing a low-frequency wave having a beat frequency equal to the difference in frequency of the received reflected wave and the wave being generated locally at that time by the oscillator 143. As is well known in the art, when the oscillator is periodically modulated as a linear function of time, the beat frequency produced at the output of the rectifier, is constant throughout the major portion of the modulating cycle, and is proportional to the absolute altitude, that is, to the height of the aircraft above the ground. To produce a suitable control signal for my purposes the beat frequency output of the rectifier 150 is applied to a frequency measuring circuit 151 which is adapted to produce at its output a voltage corresponding to the altitude.

The electronic switch 142 comprises a sawtooth wave generator 152 and a rectangular wave generator 153. The voltage generated by the frequency measuring circuit 151 is applied to the input of the sawtooth wave generator 142 which is adapted to produce at its output signals having a period proportional to the altitude. This output signal is applied to the input of the rectangular wave generator 153 having first and second output terminals 154 and 155 connected, respectively, to the first and second grids 126 and 127 of the image converter 121. This rectangular wave generator 153 is adapted to produce two rectangular waves at its output at the frequency of the signal appearing at the output of the sawtooth wave generator 153. With this rectangular wave generator 153 the bias impressed on the first grid 126 is alternately rendered highly positive or slightly negative, in the manner illustrated by the graph associated with the conductor connecting the first terminal 154 to the first grid 126. Simultaneously the bias impressed on the second grid 127 is alternately rendered highly negative or slightly negative in the manner illustrated by the graph associated with the conductor connecting the second terminal 152 to the second grid 127. Thus, it will be noticed that the first grid 126 is highly positive at the same time that the second grid 127 is highly negative, and both grids are slightly negative at the same time, thus causing the image converter 121 to be rendered alternately opaque and transparent.

A sawtooth wave generator suitable for my purposes is illustrated in Fig. 13. This sawtooth wave generator 152 comprises a pentode 159 having a cathode 154 and an anode 155, and a signal grid 156, a screen grid 157 and a suppressor grid 158 arranged in the order named between the cathode 154 and the anode 155. The control grid 156 and the suppressor grid 158 are connected through first and second biasing batteries 160 and 161, respectively, to suitable corresponding points of an input resistance 162 providing a voltage divider between the input of the sawtooth wave generator 152 and the cathode 154 of the pentode 159. The anode 155 is connected through a pulse amplitude control circuit 170 to a battery 171. The amplitude control circuit 170 comprises a glow tube 172 and a condenser 173 connected in parallel. The screen grid 157 is connected through a resistance 174 to the positive terminal of the battery 171. In operation, when a voltage is applied to the input of the sawtooth wave generator 152, the full voltage is applied to the suppressor grid 158 and a fraction thereof is applied to the signal grid 156, causing the current flowing from the anode 155 through the control circuit 170 and the battery 171 to the cathode 154 to be inversely proportional to the voltage applied to the input. Thus the voltage across the condenser 173 is changed at a rate inversely proportional to the voltage applied to the input of the sawtooth wave generator 152. Periodically when the voltage across the condenser 173 reaches the ignition voltage of the glow tube 172, the condenser 173 is discharged through the glow tube 172, thus causing a sawtooth wave voltage to appear in the anode 155 of the pentode 153 and hence at the output of the sawtooth wave generator 152. Inasmuch as the voltage applied to the input of the sawtooth wave generator 152 from the output of the frequency measuring circuit 151 is proportional to the altitude of the aircraft, the period of the sawtooth wave produced at the output of the sawtooth wave generator 152 is also proportional to the altitude of the aircraft and the image converter 121 is rendered alternately transparent and opaque for periods proportional to the altitude. Preferably the frequency of the waves generated in the sawtooth wave generator 152 is much lower than the beat frequency applied to the frequency measuring circuit 151 and is also preferably lower than the frequency of operation of the frequency modulator 144.

In operation, during the intervals that the image converter 121 is transparent, linear image traces are formed on the fluorescent anode of the image converter 121, these image traces fading away successively to permit viewing of other image traces subsequently formed on the fluorescent anode 125. The angle that these traces make with the normal or vertical axis of the aircraft is the drift angle α and the lengths of these linear traces is proportional to the ground speed of the aircraft. While at least one of these linear traces is visible on the anode 125 the drift angle may be readily measured by rotating the drift lines of the disc 128 into position parallel to the linear trace and the speed may be determined by measuring the length of the trace by means of the speed measuring lines disposed on the measuring disc transversely to the drift lines in the manner previously explained.

In a practical embodiment of the invention illustrated in Fig. 14, the ground speed meter hereinabove illustrated in Fig. 12 is so modified as to provide either for retaining images on a viewing screen for a relatively short time to permit continuous viewing of the terrain over which the aircraft is flying or for retaining images of earth objects on the screen for a relatively long time to permit formation thereon of image patterns of the types hereinabove described and is also so modified to permit retention of such an image pattern on the viewing screen to facilitate measurement thereof and to prevent other image patterns from interfering with the measurements.

In this ground speed meter 299 the anode 125a of the image converter 121a comprises both a fluorescent material and a phosphorescent material having different threshold voltages, the threshold voltage of the phosphorescent material being greater than that of the fluorescent material. In this way, a screen is provided that has a controllable image retention time that is either short or long depending upon the energy of the electrons projected toward the screen. The phosphorescent material employed for this purpose is capable of remaining excited for a period, such as a few seconds or many minutes or even longer, that is long compared with the persistence time of vision. And the fluorescent material employed for this purpose is incapable of remaining excited for such a period and is preferably of a type that does not remain noticeably excited at all after the exciting radiation is removed or if it does remain excited, the excitation persists for a time less than the persistence time of vision. Thus images formed by the phosphorescent material are retained sufficiently long to enable the user to make measurements thereon but images formed by the fluorescent material are retained for such a short time that continuous viewing of the terrain is possible. In the form shown, phosphorescent material is deposited as a layer 301 on the end face 300 at the anode end of the image converter 121a, inert material is deposited as a layer 302 over the layer 301 of phosphorescent material, and fluorescent material is deposited as a layer 303 over the layer 302 of inert material. Thus, the anode 125a comprises three layers at the viewing end of the image converter 121a, the layers of fluorescent material and inert material 302 and 303 effectively shielding the layer 301 of phosphorescent material from relatively low voltage electrons projected to the anode 125a. In order to permit selective energization of the respective layers 301 and 303 of fluorescent and phosphorescent materials, the photo-cathode 123 and the anode 125a are connected to opposite terminals of a potential divider 310 including two resistances and the electron lens 124 is connected to the junction between the two resistances. The accelerating voltage to which electrons are subjected between the cathode 123 and the anode 125a is controlled by selectively connecting either one or two batteries respectively across the potential divider 310 by movement of a battery switch $S_0$ to either position 1 or position 2. Thus, when the battery switch $S_0$ is in position 1, a single battery 313 is connected across the potential divider 310 and electrons in the electron image formed at the photo-cathode 123 are accelerated to a relatively low voltage between the photo-cathode 123 and the anode 125a permitting the electrons to penetrate the layer 303 of fluorescent material but not the layer 301 of phosphorescent material, and thus rendering the image formed on the viewing screen 125a visible for only a relatively short time. When the image converter 121 is thus operated, observation of individual images of objects in the terrain over which the aircraft is flying is possible. Similarly, with the battery switch $S_0$ in position 2, two batteries 313 and 314 are connected in series across the potential divider 310, and electrons in the electron image formed at the photo-cathode 123 are accelerated to a relatively high voltage between the photo-cathode 123 and the anode 125a permitting electrons to penetrate through the layer 303 of fluorescent material and through the layer 302 of inert material into the layer 301 of phosphorescent material and thus rendering the image formed on the viewing screen visible for a relatively long time. When the image converter 121a is thus operated the formation of image patterns on the viewing screen 125a having dimensions indicative of the velocity of the aircraft relative to an earth object over which the aircraft is flying is possible.

Within the envelope 122 of the image converter 121a adjacent the anode 125a end thereof, there is disposed a circularly shaped infra-red radiator 315, which is operative to erase image patterns formed on the phosphorescent screen in a manner more fully set forth hereinbelow. Such an infra-red radiator may be one of the type described hereinabove.

A grid bias control supply circuit 320 is provided, including a battery 321 with positive and negative terminals thereof respectively connected to the movable arms of first and second bias control switches $S_1$ and $S_2$. In position 1, these two switches $S_1$ and $S_2$ are connected to opposite ends of a first potential divider 322, the end of the potential divider 322 associated with the first switch $S_1$ being grounded. In position 2, these two switches $S_1$ and $S_2$ are connected to opposite ends of a second potential divider 323 the center tap of which is grounded.

When the first control relay 331 is in its operated condition that is when its armature coil 333 is energized, the first and second upper contacts 334 and 335 respectively of the first control relay 331 are closed, permitting appropriate interconnections to be made between the positive and negative terminals respectively of the second potential divider 323 and the first and second control grids 126 and 127 respectively of the image converter 121a. Thus when the armature coil 333 of said first control relay 331 is energized and the grid control switches $S_1$ and $S_2$ are in position 2 a fixed positive bias is applied to the first control grid 126 of the image converter 121a and a fixed negative bias is applied to the second control grid 127 of the image converter 121a. The values of the biases thus applied to the control grids 126 and 127 are so selected that electrons emitted from the photo-cathode are prevented from passing through the second control grid 127 but are collected on the first control grid 126. A first grid switch $S_3$ having its movable element connected to the first grid 126 is connected in position 1 to a slide contact 325 on the first potential divider 322 and in position 2 is normally connected through the first lower contacts 330 of a first control relay 331 to the first output terminal 154 of the rectangular wave generator 153. A second grid switch $S_4$ having its movable element connected to the second grid 127 is connected in position 1 to a slide contact 326 on the first potential divider 322 and in position 2 is normally connected through the second lower contacts 332 of the first control relay 331 to the second output terminal 155 of the rectangular wave generator 153.

When the first control relay 331 is in its normal condition, that is when its armature coil 333 is de-energized, the first and second lower contacts 330 and 332 of the first control relay 331 are closed, permitting appropriate interconnections to be made between the first and second output terminals 154 and 155 of the rectangular wave generator 153 and the control grids 126 and 127 of the image converter 121a to permit periodic rendering of the image converter 121a alternately effectively transparent and effectively opaque, in the manner hereinabove explained in connection with the description of the ground velocity meter 120 illustrated in Fig. 12.

A pulse generator 350, a frequency divider 351, and a delay network 352 are connected in tandem in the order named between the output of the sawtooth wave generator 152 and a relay coil 353 of a second control relay 354. The second control relay 354 has upper and lower normally open contacts 356 and 355, respectively. The first control relay 331 has a pair of holding, or sticking, contacts 336 which are included in a sticking circuit 337 in series with the field coil 333, a battery 338, and a first manually operable switch $S_5$. The first stop switch $S_5$ operates to condition the sticking circuit 337 for operation when in position 1 and to render it inoperative when in position 2. The lower contacts 355 of the second control relay 354 are in parallel with the sticking contacts 336 of the first control relay 331. The upper contacts 356 of the second control relay 354 are included in an eraser circuit 359 in series with a battery 360, the infra-red radiator 315, a second manually operable switch $S_6$, and a control switch $S_7$. The control switch $S_7$ is arranged to permit closing of the eraser circuit 359 when its movable element is in position 2 and to open it when in position 1. The second stop switch $S_6$ operates to render the eraser circuit 359 inoperative when in position 1 and to condition the eraser circuit 359 for operation when in position 2. The first stop switch $S_5$ in the sticking circuit 337 and the second stop switch $S_6$ in the eraser circuit 359 are ganged to permit selective simultaneous movement of the two stop switches to position 1 or to position 2.

Due to the action of the frequency divider 351, the second control relay operates periodically at a frequency $$\frac{f}{n}$$

which is a subharmonic of the frequency $f$ of the rectangular voltage waves generated by the rectangular wave generator 153. The constants of the delay network 352 are so selected that the contacts 355 and 356 of the second control relay 354 are closed periodically during an interval when the image converter 121a is effectively opaque. Furthermore, the constants of the entire apparatus are preferably so selected that the image of a single earth object may travel across the viewing screen 125a in the interval between successive operations of the second control relay 354. Thus, this ground speed meter 299 is capable of forming on the viewing screen 125a $n$ aligned linear traces from the image of a single earth object between successive operations of the second control relay 354, forming an image pattern thereon having a characteristic dimension and orientation which may be measured in the manner hereinabove described to determine the ground velocity of the aircraft. Image patterns formed in successive intervals between the instants of operation of the second control relay 354 are periodically erased at the instant of operation of the second control relay 354 by virtue of the fact that when the second control relay 354 is operated, the infra-red radiator 315 is energized and a phosphorescent image previously formed on the viewing screen 125a quenched.

Considering now the operation of the ground speed meter 299 when the stop switches $S_5$ and $S_6$ are in position 2, it is to be noted that the battery switch $S_0$, the bias control switches $S_1$ and $S_2$, the grid switches $S_3$ and $S_4$, and the eraser control switch $S_7$ are ganged to facilitate selective movement of all of these ganged switches to either position 1 or position 2. When these ganged switches are in position 1, the first and second control grids 126 and 127 are suitably negatively biased to permit continuous transmission of electron images formed on the photocathode 123 to the anode 125a. With the switches in this position, the electron image transmitted to the anode 125a penetrates the layer 303 of fluorescent material but not the layer 301 of phosphorescent material, thus permitting continuous viewing and examination of the terrain over which the aircraft is flying. However, when these ganged switches are in position 2 electron images formed at the photo-cathode 123 by projection of optical images of the earth onto the photocathode 123 are periodically transmitted to the anode 125a with sufficient energy to penetrate through the layer 303 of fluorescent material and through the layer 302 of inert material into the layer 301 of phosphorescent material, thus causing image patterns to be periodically formed on the viewing screen 125a in the manner hereinabove explained in connection with Fig. 12. These images are formed and the eraser is operated at intervals that are long compared with the persistence time of vision but are short compared with the time interval for which the screen is capable of retaining the images for observation.

To permit retention of an image pattern on the viewing screen 125a to facilitate the measurement of ground velocity the stop switches $S_5$ and $S_6$ are moved to position 1, thus conditioning the sticking circuit 337 associated with the first control relay 331 and at the same time rendering the eraser circuit 359 inoperative. With the stop switches $S_5$ and $S_6$ in position 1, the next time that a pulse is applied to the coil 353 of the second control relay 354, the lower contacts 355 of the second control relay 354 close, thus completing the sticking circuit 337 and energizing the coil 333 of the first control relay. Upon energization of this coil 333 the first control relay 331 operates, thereby connecting the first grid 126 of the image converter 121a through the first upper contacts 334 to the positive terminal of said potential divider 323 and connecting the second grid 127 through the second upper contacts 335 to the negative terminal of the potential divider 323 and simultaneously closing the sticking contacts 336. The closing of the sticking contacts 336 causes the first control relay coil 331 to remain energized as long as the stop switches $S_5$ and $S_6$ remain in position 1, and accordingly causes the image converter 121a to retain the image pattern formed thereon for a long time such as many minutes or even longer and renders the image converter 121a effectively opaque so that no interfering image pattern is formed on the viewing screen 125a. A characteristic dimension of the image pattern thus retained on the screen 125a and its orientation thereon are then measured with the aid of the measuring disc 128 in the manner hereinbefore set forth. After this measurement is made periodic operation of the image converter 121a is resumed by moving the stop switches $S_5$ and $S_6$ to position 2.

The ground speed meters 120 and 299 described in connection with Figs. 12 and 14 may be modified, if desired, by substituting a mechanical exposure control system 59 of the type described in connection with Fig. 4 for the electrical exposure control system including the control grids 126 and 127 of the image converters 121 and 121a. Many other modifications may be made in these ground speed meters without departing from the true spirit and scope of the invention. In particular, it will be appreciated that the principles involved in the formation of electron images at the photo-cathode of the image converters 121 and 121a and the transmission of these electron images to a suitable fluorescent or phosphorescent screen may be carried out with other types of apparatus such as apparatus of the television type. In this case, the photo-cathode or other photo sensitive screen and the fluorescent or phosphorescent screen are included in individual envelopes and an electrical link is provided between the two for transferring the electron image formed on the photo-cathode to the viewing screen.

The screen 115 of Fig. 9, the screen 125 of Fig. 12, and the phosphorescent layer 301 of Fig. 14 are of the cascade type when very long image persistence or retention times are required. A cascade type screen or layer is composed of two types of phosphors. One type of phosphor emits short wave length radiation such as blue, violet, or ultra-violet radiation when excited by accelerated electrons. The second type of phosphor emits visible radiation such as green, yellow or orange light when excited by such short wave length radiation. By exciting the second phosphor in this way, instead of only by accelerated electrons, longer persistence is achieved.

Phosphors which are of the first type and which emit short wave length radiation when excited by accelerated electrons have long been well known, and include, for example, standard P5, P11 and P15 phosphors which have peak fluorescent emission at 4300 A., 4600 A., and 3700 A. respectively. Phosphors which are of the second type and which are excited by short wavelength radiation and have long persistence times have also been well known for a long time and include many zinc sulphide phosphors. A zinc sulphide phosphor that contains traces of activating impurities such as copper is especially suitable for achieving the desired retentivity. Many of such activated phosphors, especially those which contain traces of "poisons" such as nickel, cobalt, or iron may be readily deexcited by selective exposure to infra-red radiation.

Accordingly, a phosphorescent cascade screen composed of a layer of a phosphor of the first type deposited on a layer of a phosphor of the second type is employed when images are to be formed by means of accelerated electrons and the images are to be retained for a long time. The latter layer comprises a phosphor which is of the second type and which is deexcited by exposure to infra-red radiation, when such images are to be erased with infra-red radiation. Thus the phosphorescent layer 115, 125, or 301 is made in the form of such a multiple-layer cascade screen when such long persistence and erasing are desired. Of course, when continuous viewing is not also desired, the inner layer 302 and the fluorescent layer 303 are omitted.

If desired, the objective lenses and associated image forming apparatus of the ground speed meters may be mounted on a platform which is stabilized gyroscopically or in some other manner in order to avoid difficulties arising from pitching, banking, or yawing of the aircraft. Difficulties arising from these sources may also be eliminated by arresting the operation of the exposure control system during such times in the flight of the aircraft that the image patterns formed are free of such errors.

In view of the foregoing description of various ground velocity meters constructed and operated in accordance with the principles of my invention, it is clear that the ground speed meters described are capable of many alterations and modifications to meet different practical requirements.

For example, it will now be clear to those skilled in the art that other types of materials capable of being excited and deexcited or otherwise changed and restored in other ways may also be employed in practicing my invention. Furthermore, my invention may be employed for other purposes than ground speed measurement, and may also be employed in connection with other types of images than those specifically described herein. Thus, while my invention has been described in terms of certain elements and features in specific combinations which are now considered to represent the best embodiments of my invention, it is to be understood that some of them may be combined in other specific ways or replaced by similar elements, and some may be omitted altogether without departing from the true spirit and scope of my invention.

I claim as my invention:

1. In a device for measuring ground speed of an aircraft, the improvement which comprises a phosphorescent screen adapted to emit radiation for a substantial period greater than a predetermined time interval after being exposed to an image, and means including a shutter for forming on said screen persistent streaks of a length corresponding to the ground speed of the aircraft by exposing said screen for a period shorter than said predetermined time interval to an image of the earth over which an aircraft is flying.

2. In an image forming system, the combination of: a screen on which may be formed an image of decaying intensity, said screen being adapted to retain such an image for a prolonged period, means for forming an image of a distant moving object and means for forming a persistent streaked image of such object on the screen of a length corresponding to the speed of the object by exposing said screen to the first above mentioned image for a predetermined time interval less than said prolonged period.

3. In an instrument for navigation of a craft utilizing a screen comprising a material having a characteristic which may be temporarily changed for a prolonged period by exposure to an image, the improvement which comprises means for producing on said screen a linear pattern of simultaneously existing image points of temporarily changed characteristic, having a characteristic length related to the speed of said craft by intermittently exposing said screen for predetermined time intervals less than said prolonged period to an image of an object with respect to which said craft is moving, each image point being representative of said object, and means for measuring said characteristic length of said linear pattern.

4. An aircraft navigation instrument comprising a screen capable of retaining an image for a limited time duration, means for receiving energy from a distant object, periodically operating means cooperating with said means for producing on said screen a linear image pattern having a characteristic length indicative of the speed of the aircraft by translating the energy received from said object at successive times in a predetermined time interval less than said limited time duration to form a corresponding succession of spaced images at said screen, and means for measuring the characteristic length of said image pattern.

5. An aircraft navigation instrument comprising a screen capable of retaining an image for a prolonged period, said screen having a datum line associated therewith, means for receiving energy from a distant object relative to which the aircraft is moving, means for producing on said screen a linear image pattern of simultaneously existing images of said object and having a characteristic length indicative of the speed of the aircraft and an orientation with respect to said datum line indicative of the drift of the aircraft by projecting the energy received from said object at successive times in a predetermined time interval shorter than said prolonged period as a corresponding succession of aligned images onto said screen, and means for measuring the characteristic length and the orientation of said image pattern as an indication of the velocity of said aircraft.

6. An aircraft navigation instrument comprising a screen formed of a material having a physical characteristic which is changeable in one direction upon exposure to radiation of a first kind and in the reverse direction upon exposure to radiation of a second kind, image forming means for forming an image of a distant object, said image comprising radiation of said first kind, means for forming an image pattern on said screen of simultaneously existing images of said object and having a characteristic dimension indicative of the speed of the aircraft by rendering said image forming means operative to sequentially project a succession of images of said object onto said screen during a predetermined time interval less than the period for which said screen is capable of remaining changed in said one direction, whereby said physical characteristic is changed in said one direction at successive spaced points of said screen onto which said images are successively projected, and means including a source of radiation of said second kind for changing said physical characteristic in the reverse direction whereby said image pattern is erased from said screen.

7. An aircraft navigation instrument comprising a screen formed of a material having a physical characteristic which may be changed from a first condition to a second condition by exposure to radiation in a first wave length range and from the second condition to the first condition by exposure to radiation in a second wave length range, image forming means adapted to form an image of a distant object, said image comprising radiation in said first wave length range, means for forming an image pattern on said screen of simultaneously existing images of said object and having a characteristic dimension indicative of the speed of the aircraft relative to said object by rendering said image forming means operative to sequentially project a succession of images of said object onto said screen during a predetermined time interval less than the period for which said screen is capable of remaining changed in said one direction whereby said physical characteristic is changed from said first condition to said second condition at successive spaced points of said screen onto which said images are successively projected, means for measuring the characteristic dimension of said image pattern, and means including a source of radiation in said second wavelength range for restoring said physical characteristic to its first condition thereby erasing said image pattern from said screen.

8. An aircraft navigation instrument comprising a screen capable of retaining an image for a prolonged period, means for receiving energy from a distant object, image producing means for producing on said screen a pattern of simultaneously existing spaced images of said object, which pattern has a characteristic dimension indicative of the speed of the aircraft by translating the energy received from said object at successive times in a predetermined time interval less than said prolonged period into a corresponding succession of spaced images at said screen whereby a pattern of simultaneously observable spaced images is produced thereon having a characteristic dimension indicative of the speed of the aircraft, image erasing means operative to erase said image pattern from said screen, a common control device for rendering said image producing means and said image erasing means successively operative, and means for measuring said characteristic dimension of said image pattern.

9. An aircraft navigation instrument comprising a screen capable of retaining an image for a prolonged period, means for receiving energy from a distant object, image producing means operative to translate the energy received from said object at successive times in a predetermined time interval into a corresponding succession of spaced images that excite said screen whereby a pattern of simultaneously observable spaced images is produced thereon having a characteristic dimension indicative of the speed of the aircraft, image erasing means operative to erase such an image pattern from said screen, a common control device for alternately rendering said image producing means and said image erasing means periodically operative whereby such an image pattern is periodically formed on said screen and erased therefrom in each cycle of operation, independently controllable means cooperating with said control device for effectively arresting the operation of said image erasing means after said image forming means has operated in a selected cycle of operation to permit retention of such an image pattern on said screen, and means for measuring said characteristic dimension of said retained image pattern.

10. In an aircraft navigation instrument a screen capable of retaining an image for a prolonged period, means for receiving energy from a distant object, image producing means operative to translate the energy received from said object at successive times in an interval less than said prolonged period into a corresponding succession of spaced images that excite said screen, whereby a pattern of simultaneously observable spaced images is produced on said screen having a characteristic dimension indicative of the speed of the aircraft, image erasing means operative to erase said image pattern from said screen, first and second control means respectively associated with said image producing means and said image erasing means, a common control device adapted to alternately operate said first and second control means, master control means having operated and restored positions, means responsive to movement of said master control means to its restored position for rendering said first and second control means subject to the control of said common control device whereby an image pattern is periodically formed on said screen and erased therefrom, means responsive to movement of said master control means to its operated position for rendering said erasing means inoperative and for conditioning said first control means and means responsive to subsequent operation of said second control means for rendering said image producing means inoperative whereby such an image pattern is retained on said screen.

11. In an aircraft navigation instrument a screen capable of retaining an image for a prolonged period, means for receiving energy from a distant object, image producing means operative to translate the energy received from said object at successive times into a corresponding succession of spaced images at said screen whereby a pattern of simultaneously observable images is formed thereon, image erasing means operative to erase said image pattern from said screen, first and second control means respectively associated with said image producing means and said image erasing means, a common control device including an altimeter adapted to alternately operate said first and second control means periodically at a frequency inversely proportional to the altitude, master control means having operated and restored positions, means responsive to movement of said master control means to its restored position for rendering said first and second control means subject to the control of said common control device whereby an image pattern is periodically produced on said screen having a dimension proportional to the speed of the aircraft and periodically erased therefrom, means responsive to movement of said master control means to its operated position for rendering said erasing means inoperative and for conditioning said first control means, and means responsive to subsequent operation of said second control means for rendering said image forming means inoperative, whereby such an image pattern is retained on said screen.

12. An instrument for aerial navigation comprising: a screen capable of retaining an image for a prolonged period, means for receiving energy from a distant object, means for translating energy received from said object into a succession of spaced images at said screen during an interval less than said prolonged period, means for forming on said screen a linear pattern of simultaneously existing spaced images which pattern has a characteristic length indicative of the speed of said object by periodically interrupting the translation of such energy into images, and means for measuring said characteristic length.

13. In aircraft navigation, the method comprising creating in a measured time interval a succession of fugitive images of an earth object relative to which the aircraft is moving, retaining a series of such images for a limited time duration greater than said measured time interval thereby producing a linear pattern of simultaneously observable spaced images having a characteristic length corresponding to the speed of the aircraft relative to the earth object, and measuring the characteristic length of the image pattern as an indication of the speed of the craft relative to the earth object.

14. In a method of measuring the speed of a distant object moving relative to a position from which said measurement is being made, the steps of receiving energy from said object at said position, converting the energy received in a measured time interval into a succession of fugitive images of said object while it is moving relative to said position, retaining a series of such images for a limited time duration greater than said measured time interval thereby producing a linear pattern of simultaneously observable spaced images having a characteristic length corresponding to the speed of said object that is moving relative to said position, and measuring said characteristic length that corresponds to the speed of said object relative to said position to determine such speed.

15. In an aircraft navigation instrument, a screen having a controllable image retention period that is either short or long, means operative to form on said screen a succession of images of a distant object, and means for selectively controlling the image retention period of said screen for presenting a succession of instantaneously observable images of said object on said screen when the retention period thereof is short and for presenting a succession of simultaneously observable images of said object on said screen when the retention period thereof is long, and means for measuring the relative position of images formed on said screen.

16. In an aircraft navigation instrument, a screen having a controllable image retention period that is either short or long, image forming means operative to form on said screen a succession of images of a distant object, control means selectively operative to set the image retention period of said screen for presenting a succession of instantaneously observable images of said object on said screen when the image retention period thereof is short and for presenting a succession of simultaneously observable images of said object on said screen when the image retention period thereof is long, and means operative when the image retention period is long for operating said image forming means through a measured time interval whereby a succession of simultaneously observable images presented by said screen forms an image pattern having a characteristic dimension indicative of the speed of the aircraft.

17. In an aircraft navigation instrument, a screen, an altimeter adapted to develop a voltage corresponding to the altitude of an aircraft, a signal generator comprising amplifying means including a pair of control electrodes of different characteristics and an output circuit controlled thereby, means for applying the voltage developed by said altimeter in predetermined proportions to said electrodes whereby signals are developed in said output circuit at a frequency that varies as an inverse function of the altitude, and means controlled by said output circuit for exposing said screen to an image of a distant object at said frequency whereby an image pattern is formed on said screen having a dimension indicative of the speed of the aircraft.

18. In an aircraft navigation instrument, a screen, an altimeter adapted to develop a voltage corresponding to the altitude of an aircraft, an impulse generator comprising amplifying means including a pair of control electrodes of different characteristics and a discharge circuit controlled thereby, means for applying the voltage developed by said altimeter in predetermined proportions to said electrodes whereby said circuit discharges at a frequency that varies as an inverse function of the altitude, and means controlled by the output of said circuit for exposing said screen to an image of a distant object at said frequency whereby an image pattern is formed on said screen having a dimension indicative of the speed of the aircraft.

19. In a system for forming an image of an object located in a distant object field, a screen capable of retaining an image for a time interval exceeding a prolonged period that is long compared with the persistence time of vision, image producing means for receiving energy from such a distant object field and operative to project an image of said object field during a predetermined time interval less than said prolonged period onto said screen to form a corresponding persistent image thereon, such projection occurring along an axis that bears a fixed relationship to said screen, image erasing means including a source of radiation arranged to simultaneously expose all parts of said screen and operative to erase such image from said screen, and means for rendering said image producing means and said image erasing means alternately operative at intervals long compared with the persistence time of vision for relatively long and relatively short periods respectively.

20. In an image forming system, a screen capable of retaining an image for a prolonged period, means for receiving energy from a distant object, image producing means operative to translate the energy received from said object into a corresponding image on said screen, image erasing means operative to erase such an image from said screen, a common control device for alternately rendering said image producing means and said image erasing means periodically operative whereby such an image is periodically formed on said screen and erased therefrom in each cycle of operation, and independently controllable means cooperating with said control device for effectively arresting the operation of said image erasing means after said image forming means has operated in a selected cycle of operation to permit retention of such an image on said screen.

21. In an image forming system, an evacuated envelope having a screen capable of retaining an image for a prolonged period; image producing means comprising an electrode structure including a source of cathode rays in said envelope operative to form a persistent image on said screen; image erasing means operative to erase such a persistent image from said screen; a common control device for rendering said electrode structure and said image erasing means periodically operative at different times whereby such a persistent image is periodically formed on said screen and erased therefrom in each cycle of operation; and independently controllable means cooperating with said control device for effectively arresting the operation of said image erasing means after said image forming means has operated in a selected cycle of operation to permit retention of such an image on said screen.

22. In an image forming system, a screen capable of retaining an image for a prolonged period, means for receiving energy from a distant object, image producing means operative to translate the energy received from said object into a corresponding image on said screen, image erasing means operative to erase said image from said screen, first and second control means respectively associated with said image producing means and said image erasing means, a common control device adapted to alternately operate said first and second control means, master control means having operated and restored positions, means responsive to movement of said master control means to its restored position for rendering said first and second control means subject to the control of said common control device whereby an image is periodically formed on said screen and erased therefrom, means responsive to movement of said master control means to its operated position for rendering said erasing means inoperative and for conditioning said first control means, and means responsive to subsequent operation of said second control means for rendering said image producing means inoperative whereby such an image is retained on said screen.

23. In an image forming system, an evacuated envelope having a screen capable of retaining an image for a prolonged period; image producing means comprising an electrode structure including a source of cathode rays in said envelope operative to form a persistent image on said screen by causing different amounts of electrons to bombard different parts of said screen, image erasing means operative to erase such a persistent image from said screen, first and second control means respectively associated with said electrode structure and said image erasing means, a common control device adapted to alternately operate said first and second control means, master control means having operated and restored positions, means responsive to movement of said master control means to its restored position for rendering said first and second control means subject to the control of said common control device whereby an image is periodically formed on said screen and erased therefrom, means responsive to movement of said master control means to its operated position for rendering said erasing means inoperative and for conditioning said first control means, and means responsive to subsequent operation of said second control means for rendering said image producing means inoperative whereby such a persistent image is retained on said screen.

24. In an image forming system, an envelope having a screen therein composed of a material that is characterized by becoming excited under the influence of electron bombardment and is characterized by remaining excited for a time interval exceeding a prolonged period that is long compared with the persistence time of vision after such bombardment is discontinued and that is also characterized by becoming de-excited by subsequent exposure to electro-magnetic radiation of a selected wavelength range, said envelope having a transparent portion in the wall thereof for viewing said screen, image forming means including a source of electrons arranged in said envelope at a position therein remote from said screen for bombarding said screen with accelerated electrons for forming a persistent image that is observable all at one time over an extended area of said screen for longer than said prolonged period, and means including a source of such radiation arranged within said envelope between said screen and said electron source to flood all parts of said area of said screen simultaneously with such radiation at the end of said prolonged period for erasing such a persistent image.

25. In an image forming system, an envelope having a screen therein composed of a material that is characterized by becoming visibly modified under the influence of electron bombardment and is characterized by remaining so modified for a prolonged period after such bombardment is discontinued and that is also characterized by becoming restored by subsequent exposure to electromagnetic radiation of a selected wavelength range; a source of such radiation; means for bombarding said screen with accelerated electrons to form a persistent image that is simultaneously visible over an extended area of said screen and for simultaneously rendering said source inoperative; and means for rendering said source operative whereby said persistent image is erased and for simultaneously suppressing the bombardment of said screen by accelerated electrons.

26. In an image forming system, a screen composed of a material that is characterized by becoming visibly modified upon exposure to accelerated electrons and is characterized by remaining so modified for a prolonged period after such exposure is discontinued and that is also characterized by becoming restored by subsequent exposure to electromagnetic radiation of a selected wavelength range; a source of such radiation; image forming means comprising an electrode structure including a cathode operative to expose said screen to accelerated electrons to form a persistent image over an extended area of said screen; a first voltage source associated with said electrode structure for effecting the exposure of said screen to accelerated electrons; a second voltage source associated with said radiation source; a first means for applying voltages from said first voltage source to, and removing such voltages from said electrode structure for selectively causing and suppressing such exposure of said screen to accelerated electrons; and a second means for connecting and disconnecting said radiation source with said second voltage source for selectively retaining and erasing such persistent images.

27. An image forming system as defined in claim 26 comprising cyclically operating means for synchronously changing the conditions of both said first means and said second means to repeatedly form persistent images on and erase such images from said screen.

28. An image forming system as defined in claim 26 including means for periodically operating said first means and said second means to repeatedly form and erase such persistent images.

29. In an image forming system, an envelope having a screen therein composed of a material that is characterized by becoming excited under the influence of electron bombardment and is characterized by remaining excited for a time interval exceeding a prolonged period that is long compared with the persistence time of vision after such bombardment is discontinued and that is also characterized by becoming de-excited by subsequent exposure to electromagnetic radiation of a selected wavelength range, said envelope having a transparent portion in the wall thereof for viewing said screen, image forming means for bombarding said screen with accelerated electrons to form a persistent image that is observable all at one time over an extended area of said screen, a source of such radiation arranged to flood all parts of said area of said screen simultaneously, erasing means for energizing said source to erase said image, control means for automatically periodically operating said image forming means and said erasing means at different times that are spaced apart by such a prolonged period for periodically forming and erasing such a persistent image, and means for suspending operation of said control means to retain such a persistent visible image for observation for such a time interval.

30. An image forming system as defined in claim 29 comprising means for initiating resumption of operation of said control means after its operation has been suspended and while said persistent image is visible.

31. In a method of reproducing and observing an image of a distant object field by means of a screen composed of a material adapted to remain modified for a time exceeding a prolonged period that is long compared with the persistence time of vision after being bombarded by accelerated electrons and adapted to be restored by exposure to quenching radiation in a predetermined wavelength range, the steps which comprise: receiving energy of different intensities from various points of the distant object field, periodically bombarding various segments of said screen with amounts of accelerated electrons corresponding with the amounts of radiation received from corresponding points in the object field while said screen is not flooded with such quenching radiation to cause a succession of simultaneously observable persistent images of the same said distant object field to be formed on said screen, retaining all of said persistent images thereon for such a corresponding prolonged period, and alternately periodically flooding all parts of said screen with such quenching radiation simultaneously at the end of each of such periods, thereby erasing all of such images and preparing said screen to reproduce a new persistent image.

32. In an image forming system, an envelope having a screen capable of retaining an image for a prolonged period; means comprising an electrode structure including a source of electrons located within said envelope; means for receiving energy from a distant object field and operative to translate the energy received from said object field into a corresponding persistent image on said screen by causing different amounts of such electrons to bombard different parts of said screen; a source of radiation in a position to expose said screen and operative to erase such a persistent image from said screen; a first voltage source associated with said electrode structure for effecting the acceleration of said electrons; a second voltage source associated with said radiation source; a first control means having first and second conditions in which voltages from said first voltage source are respectively applied to and removed from said electrode structure for selectively causing and suppressing such bombardment of said screen by accelerated electrons; a second control means having first and second conditions in which said second voltage source is respectively disconnected from and connected to said radiation source for selectively retaining and erasing such persistent images; and common control means for concurrently changing the conditions of both said control means.

33. In an image forming system, an envelope having a screen capable of retaining an image for a prolonged period; means comprising an electrode structure including a source of electrons located within said envelope; means for receiving energy from a distant object field and operative to translate the energy received from said object field into a corresponding persistent image on said screen by causing different amounts of such electrons to bombard different parts of said screen; a source of radiation in a position to expose said screen and operative to erase such a persistent image from said screen; a first voltage source associated with said electrode structure for affecting the acceleration of said electrons; a second voltage source associated with said radiation source; a first control means having first and second conditions in which voltages from said first voltage source are respectively applied to and removed from said electrode structure for selectively causing and suppressing such bombardment of said screen by accelerated electrons; a second control means having first and second conditions in which said radiation source is respectively disconnected from and connected to said second voltage source for selectively retaining and erasing such persistent images; and cyclically operating means for synchronously changing the conditions of both said control means to repeatedly form such images on and erase such images from said screen.

34. In a system for forming an image of an object located in a distant object field, a screen structure formed of a material having a physical characteristic which is changeable in one direction upon exposure to rays of one kind and in the reverse direction upon exposure to rays of a different kind, image forming means for forming an image of such distant object field, said image comprising rays of said one kind, means for rendering said image forming means periodically operative at one frequency to project said images onto said screen structure for a predetermined time interval less than the period for which said material is capable of remaining changed in said one direction, whereby a series of persistent images is formed and retained on said screen structure for a prolonged period, such projection occurring along an axis that bears a fixed relationship to said screen, a source of rays of said different kind for changing said physical characteristic in the reverse direction, and means for rendering said source operative periodically at a lower frequency whereby said series of persistent images is erased from said screen.

35. In an image forming system, a screen composed of a material that is characterized by becoming modified from an initial condition upon exposure to accelerated electrons and is characterized by remaining so modified after such exposure for a time interval exceeding a prolonged period long compared with the persistence time of vision and that is also capable of becoming restored to such initial condition; erasing means operative to restore said screen when so modified; image forming means comprising an electrode structure operative to expose said screen to accelerated electrons to form a persistent image over an extended area of said screen; voltage supply means for applying voltages to said electrode structure for effecting the exposure of said screen to accelerated electrons; a first control means for selectively rendering said voltage supply means operative to selectively cause and suppress such exposure of said screen to accelerated electrons; and a second control means for selectively operating said erasing means at the end of said prolonged period for selectively retaining and erasing such persistent images.

36. In a system for forming an image of an object in a distant object field, a screen composed of a material that is characterized by becoming modified from an initial condition upon exposure to accelerated electrons and is characterized by remaining so modified after such exposure for a time interval exceeding a prolonged period long compared with the persistence time of vision and that is also capable of becoming restored to such initial condition; erasing means operative to restore said screen when so modified; image forming means comprising means for receiving radiation from a distant object field and an electrode structure operative to expose said screen to accelerated electrons to form on said screen a persistent image of said object in accordance with the received radiation; voltage supply means for applying voltages to said electrode structure for effecting the exposure of said screen to accelerated electrons; a first control means for selectively rendering said voltage supply means operative to selectively cause and suppress such exposure of said screen to accelerated electrons; and a second control means for selectively operating said erasing means at the end of said prolonged period for selectively retaining and erasing such persistent images.

37. In a system for forming an image of an object in a distant object field, a screen composed of a material that is characterized by becoming modified from an initial condition upon exposure to rays of a selected kind and is characterized by remaining so modified after such exposure for a time interval exceeding a prolonged period long compared with the persistence time of vision and that is also capable of becoming restored to such initial condition; erasing means operative to restore said screen when so modified; image forming means including a source of such rays mounted in fixed relationship to said screen for forming on said screen an image of said object field by projecting rays of said selected kind onto said screen whereby a persistent image is formed on said screen; means for viewing said persistent image from the opposite side of said screen from said source; voltage supply means for applying voltages to said image forming means for effecting the exposure of said screen to such rays; a first control means for selectively rendering said voltage supply means operative to selectively cause such exposure of said screen to such rays; and a second control means for selectively operating said erasing means at the end of said prolonged period for selectively retaining such a persistent image for a time exceeding such prolonged period and for erasing such persistent image at the end of said prolonged period.

38. In a system for forming an image of an object in a distant object field, a screen composed of a material that is characterized by becoming modified from an initial condition upon exposure to rays of a selected kind and is characterized by remaining so modified after such exposure for a time interval exceeding a prolonged period long compared with the persistence time of vision and that is also capable of becoming restored to such initial condition; image forming means mounted in fixed relationship to said screen for forming on said screen an image of said object field by projecting rays of said selected kind onto said screen whereby a persistent image is formed on said screen; erasing means including an erasing element on the same side of said screen as said source and also mounted in fixed relationship with said screen, said erasing means being operative to restore said screen when so modified; means for viewing said persistent image from the opposite side of said screen from said source and said erasing element; voltage supply means for applying voltages to said image forming means for effecting the exposure of said screen to such rays; a first control means for selectively rendering said voltage supply means operative to selectively cause such exposure of said screen to such rays; and a second control means for selectively operating said erasing means at the end of said prolonged period for selectively retaining such an image for a time long compared with such persistence time and for erasing such persistent image.

39. In an image forming system, a screen composed of a material that is characterized by becoming modified from an initial condition upon exposure to accelerated electrons and is characterized by remaining so modified after such exposure for a time interval exceeding a prolonged period long compared with the persistence time of vision and that is also capable of becoming restored to such initial condition; erasing means operative to restore said screen when so modified; image forming means comprising an electrode structure operative to expose said screen to accelerated electrons to form a persistent image over an extended area of said screen; means periodically operative at times separated by intervals long compared with the persistence time of vision but short compared with said first-mentioned time interval for periodically and alternately operating said image forming means and said image erasing means for periodically forming and retaining images for such latter intervals and erasing such images at the ends of said latter intervals; and means for suspending the operation of said periodically operative means while such a persistent image is on said screen to retain said latter image for a time interval exceeding said latter interval.

40. In a method of image formation utilizing a screen composed of a material that is characterized by becoming modified from an initial condition upon exposure to rays of one kind and by remaining so modified for a time interval exceeding a prolonged period long compared with the persistence time of vision, and that is also capable of becoming restored to such initial condition upon exposure to rays of a second kind, the steps of receiving radiation from an object field the image of which is to be formed, translating said received radiation into rays of said first kind during a time interval less than said prolonged period to modify a part of said screen thereby to produce a persistent image of said object field on said screen by modifying such condition at a part of the screen, thereafter restoring said screen to its said initial condition by exposing said screen to rays of said second kind thereby to erase said image from said screen, regularly and alternately repeating said translating and restoring steps to periodically modify and restore said screen thereby to periodically produce images of said object field on, and erase images of said object field from said screen at regular spaced time intervals, said periodic steps each being spaced in time from one another by a predetermined time interval exceeding the persistence time of vision whereby each successive image formed on said screen persists thereon for a time interval long compared to the persistence of vision prior to erasure of said image from said screen, and selectively interrupting said alternately repeated steps prior to one of said restoring steps thereby to retain one of said images on said screen for a time interval longer than said predetermined time interval.

41. In a method of image formation utilizing a luminescent screen composed of a material that is characterized by becoming modified from an initial condition upon exposure to rays of one kind and by remaining so modified for a time interval exceeding a prolonged period long compared with the persistence time of vision and that is also capable of becoming restored to such initial condition upon exposure to rays of a second kind, the steps of exposing said screen to rays of said first kind at predetermined time intervals less than said prolonged period to modify a part of said screen thereby to produce a persistent image on said screen by modifying such condition at a part of the screen, restoring said screen to its said initial condition by exposing said screen to rays of said second kind thereby to erase said persistent image from said screen, and periodically and alternately repeating said exposure and restoring steps to regularly modify and restore said screen thereby to regularly produce images on and erase images from said screen, said periodic steps each being spaced in time from one another by a time interval exceeding the persistence time of vision whereby successive images formed on said screen persist thereon for a time interval long compared to the persistence time of vision prior to erasure of said image from said screen, and selectively suspending said alternately repeated steps subsequent to one of said exposure steps and prior to the next subsequent restoring step.

References Cited in the file of this patent

UNITED STATES PATENTS

| | | |
|---|---|---|
| 2,153,718 | Kitroser | Apr. 11, 1939 |
| 2,189,319 | Morton | Feb. 6, 1940 |
| 2,236,390 | Wood et al. | Mar. 25, 1941 |
| 2,292,153 | Olson | Aug. 4, 1942 |

FOREIGN PATENTS

| | | |
|---|---|---|
| 291,121 | Great Britain | May 30, 1928 |

UNITED STATES PATENT OFFICE
CERTIFICATE OF CORRECTION

Patent No. 2,954,608                          October 4, 1960

Reed C. Lawlor

It is hereby certified that error appears in the above numbered patent requiring correction and that the said Letters Patent should read as corrected below.

Column 2, line 54, for "in", first occurrence, read -- is --; line 57, for "partily" read -- partly --; line 72, for "on" read -- in --; column 5, line 20, strike out "and"; column 6, line 6, for "infrar-red" read -- infra-red --; column 10, line 5, for "72A, 72B, and 72C" read -- 72a, 72b, and 72c --; same column 10, line 68, for "$T_2$" read $T_2a$ --; column 12, line 18, after "curtain" insert -- shutters --; column 29, line 35, for "affecting" read -- effecting --.

Signed and sealed this 8th day of October 1963.

(SEAL)
Attest:

ERNEST W. SWIDER
Attesting Officer

EDWIN L. REYNOLDS
Acting Commissioner of Patents